(12) United States Patent
Vittorelli et al.

(10) Patent No.: US 12,530,215 B2
(45) Date of Patent: Jan. 20, 2026

(54) PROCESSING SYSTEM, RELATED INTEGRATED CIRCUIT, DEVICE AND METHOD FOR CONTROLLING COMMUNICATION OVER A COMMUNICATION SYSTEM HAVING A PHYSICAL ADDRESS RANGE

(71) Applicants: STMICROELECTRONICS APPLICATION GMBH, Aschheim-Dornach (DE); STMicroelectronics International N.V., Geneva (CH)

(72) Inventors: Boris Vittorelli, Pfaffing (DE); Simrata Batra, New Delhi (IN); Vivek Kumar Sood, Lucknow (IN); Deepak Baranwal, Greater Noida (IN)

(73) Assignees: STMICROELECTRONICS APPLICATION GMBH, Aschheim-Dornach (DE); STMicroelectronics International N.V., Geneva (CH)

( * ) Notice: Subject to any disclaimer, the term of this patent is extended or adjusted under 35 U.S.C. 154(b) by 613 days.

(21) Appl. No.: 17/736,590

(22) Filed: May 4, 2022

(65) Prior Publication Data
US 2022/0357973 A1 Nov. 10, 2022

(30) Foreign Application Priority Data
May 6, 2021 (IT) .......................... 102021000011639

(51) Int. Cl.
*G06F 9/455* (2018.01)
(52) U.S. Cl.
CPC ............ *G06F 9/45558* (2013.01); *G06F 2009/45575* (2013.01)
(58) Field of Classification Search
CPC .......... G06F 9/45533–46; G06F 2009/45575
See application file for complete search history.

(56) References Cited

U.S. PATENT DOCUMENTS 10,713,177 B2   7/2020 Neiger et al.
2015/0254189 A1* 9/2015 Coppola ............ G06F 9/45533
                                                 711/163

(Continued)

FOREIGN PATENT DOCUMENTS

CN   107015845 A   8/2017
CN   108388528 A   8/2018

(Continued)

OTHER PUBLICATIONS

Achieving a Scalable E/E-Architecture Using Autosar and Virtualization Dominik Reinhardt, Dirk Kaule, Markus Kucera (Year: 2013).*

(Continued)

*Primary Examiner* — April Y Blair
*Assistant Examiner* — Paul V Mills
(74) *Attorney, Agent, or Firm* — Seed IP Law Group LLP

(57) ABSTRACT

A communication system couples a plurality of processing cores together, each having an associated register storing a virtual machine ID, which is inserted into requests sent by the respective processing core. A master circuit has associated a master interface circuit, wherein the master interface circuit has associated register for storing a second virtual machine ID, which is inserted into requests sent by the master circuit. A slave circuit has associated a slave interface circuit configured to selectively forward read or write requests addressed to an address sub-range. The slave interface circuit has associated a third register storing a third virtual machine ID associated with the address sub-range and is configured to receive a request addressed to the address sub-range, extract from the request a virtual machine ID, determine whether the extracted virtual machine ID corresponds to the third virtual machine ID, and then either forwards or rejects the request.

23 Claims, 8 Drawing Sheets

(56) References Cited

U.S. PATENT DOCUMENTS

| | | | | |
|---|---|---|---|---|
| 2015/0277949 | A1* | 10/2015 | Loh | G06F 9/45558 |
| | | | | 718/1 |
| 2015/0347051 | A1* | 12/2015 | Kruglick | G06F 3/0673 |
| | | | | 711/163 |
| 2017/0031838 | A1* | 2/2017 | Mukherjee | G06F 21/85 |
| 2018/0121125 | A1* | 5/2018 | Zeng | G06F 3/0622 |
| 2019/0361818 | A1* | 11/2019 | Ichikawa | G06F 12/1458 |
| 2020/0073694 | A1* | 3/2020 | Wallach | G06F 9/45558 |
| 2020/0133878 | A1* | 4/2020 | Asaro | G06F 12/1081 |

FOREIGN PATENT DOCUMENTS

| | | |
|---|---|---|
| CN | 112148418 A | 12/2020 |
| GB | 2545170 A | 6/2017 |
| GB | 2579721 A | 7/2020 |

OTHER PUBLICATIONS

High-Level Security Services based on a Hardware NoC Firewall Module Miltos D. Grammatikakis, Polydoros Petrakis, Antonis Papagrigoriou, George Kornaros and Marcello Coppola (Year: 2015).*

Hardware-Assisted Security in Electronic Control Units Georgios Kornaros; Othon Tomoutzoglou; Marcello Coppola (Year: 2018).*

Feng et al., "Research on Inter-VM Communication in Multi-core Virtual Machine Systems Based on Inter-core Registers," Journal of Yangtze University (Natural Science Edition) (Science and Engineering), vol. 9, No. 7, Jul. 2012, 9 pages with English translation.

Yifei et al., "A Method for IO Interface Management in a Multi-Processor SoC Chip," The 22nd Annual Computer Engineering and Technology Conference and the 8th Microprocessor Technology Forum, Dec. 31, 2018, 14 pages with English translation.

* cited by examiner

| PA1 | IF1_SEC | HYPa | } IF1 |
|---|---|---|---|
| PA2 | IF1_REG | HYPa | |
| PA3 | IF2_SEC | HYPa | } IF2 |
| PA4 | IF2_REG | HYPa | |
| PA5 | MEM_SEC | HYPa | |
| PA6 | MEM_01 | HYPa | |
| PA7 | MEM_02 | HYPa | |
| PA8 | MEM_03 | VM1 | |
| PA9 | MEM_04 | VM1 | } 100a |
| PA10 | MEM_05 | VM2 | |
| PA11 | MEM_06 | VM2 | |
| PA12 | MEM_07 | VM3 | |
| PA13 | MEM_08 | VM4 | |

PROCESSING SYSTEM, RELATED INTEGRATED CIRCUIT, DEVICE AND METHOD FOR CONTROLLING COMMUNICATION OVER A COMMUNICATION SYSTEM HAVING A PHYSICAL ADDRESS RANGE

BACKGROUND

Technical Field

Embodiments of the present disclosure relate to processing systems comprising a plurality of microprocessors, in particular processing systems configured to execute virtual machines.

Description of the Related Art

FIG. 1 shows a typical electronic system, such as the electronic system of a vehicle 30 having an engine 35, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems (PS) 101, 102 and 103 connected through a suitable communication system 20. For example, the communication system may include a vehicle control bus, such as a Controller Area Network (CAN) bus and/or Ethernet, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources 106 selected, for example, from the group of:

- one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor(s) 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., microcontrollers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several processing systems of a vehicle.

FIG. 3 shows an example of a multi-core processing system 10. Specifically, in the example considered, the processing system 10 comprises a plurality of n processing cores $102_1 \ldots 102_n$ connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI), and/or a Network-on-Chip (NoC).

For example, as shown at the example of the processing core $102_1$, each processing core 102 may comprise a microprocessor P 1020 and a communication interface IF 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, each microprocessor 1020 may also have associated a slave interface IF 1024. For example, in this way, a first microprocessor 1020 may send a request to a second microprocessor 1020 (via the master interface 1022 of the first microprocessor, the communication system 114 and the slave interface 1024 of the second microprocessor).

Generally, each processing core $102_1 \ldots 102_n$ may also comprise further local resources, such as one or more local memories M 1026, usually identified as Tightly Coupled Memory (TCM).

As mentioned before, typically the processing cores $102_1 \ldots 102_n$ are arranged to exchange data with a non-volatile memory 104 and/or a volatile memory 104b. In a multi-core processing system 10, often these memories are system memories, e.g., shared for the processing cores $102_1 \ldots 102_n$. As mentioned before, each processing cores $102_1 \ldots 102_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit. For example, the processing system 10 may comprise:

a first volatile memory 104b integrated in the integrated circuit of the processing system 10 and connected to the communication system 114 via a first memory controller 100, and a second volatile memory 104b external with respect to the integrated circuit of the processing system 10 and connected to the communication system 114 via a second memory controller 100.

As mentioned before, the processing system 10 may comprise one or more resources 106, such as one or more communication interfaces or co-processors (e.g., a cryptographic co-processor).

The resources 106 are usually connected to the communication system 114 via a respective slave communication interface IF 1064. For example, in this way, a processing core 102 may send a request to a resource 106 and the resource returns given data. Generally, one or more of the resources 106 may also comprise a respective master interface 1062. For example, such a master interface 1062 may be useful in case the resource has to start a communication in order to exchange data via (read and/or write) request with another circuit connected to the communication system 114, such as a resource 106 or a processing core 102. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Often such processing systems comprise also one or more Direct-Memory-Access (DMA) controllers 110. Specifically, a DMA controller 110 comprises at least one functional channel connected to a resource 106. Often the resource 106 associated with a given channel may also be selected as a function of configuration data. Specifically, a channel is either a read or write channel (which also may programmable) and has typically associated configuration data, which indicate:

in case of a read channel, the memory address-range from which the DMA controller should read data; and in case of a write channel, the memory address-range to which the DMA controller should write data.

For example, in this way, a communication interface IF may be connected to the DMA controller 110 via two channels:

a read channel configured to autonomously read data to be transmitted from a first memory range in the memory 104b and provide the data having been read to the communication interface IF (which then transmits the respective data); and a write channel configured to receive data having been received from the communication interface IF and autonomously write these data to a second memory range in the memory 104b.

Accordingly, a DMA controller 110 typically has associated:

a slave interface 1104 for receiving configuration data for configuring the channels of the DMA controller 110, such as the address ranges associated with each channel, from the communication system 114; and a master interface 1102 for transmitting the read or write requests via the communication system 114 to the memory controller 100.

Accordingly, from a hardware point of view, the processing system 10 shown in FIG. 3 comprises a plurality of processing cores 102 and other circuits, such as the resources 106 and the memory controller 100, connected to a communication system 114.

In this respect, the processing system 10 may execute several software tasks, e.g., by executing in sequence tasks on the same processing core 102 and/or in parallel on a plurality of processing cores 102. However, such tasks may execute rather different operations. Accordingly, from a safety and/or security point of view, each task should have only given access rights.

For example, in many processing systems 10, this problem is solved by using a software and/or hardware address range protection.

For example, as shown in FIG. 4, often such address range protections are implemented by separating the software tasks into tasks of an operating system OS and tasks of applications APP executed by the operating system OS. In this case, the operating system OS may manage a (e.g., virtual) address range for each application APP.

Specifically, in a software protection mechanism, all read and write requests of an application APP have to pass through the operating system OS, which thus may determine whether a given request belongs to the (virtual) address range associated with the application.

Conversely, in a hardware address protection, the (e.g., virtual) address ranges are directly communicated to the hardware layer, which thus may determine whether a given software task may access a given address.

For example, in an ARM AArch64 architecture, the operating system OS may configure a plurality of virtual address ranges, which are identified via an Address Space ID (ASID). For example, in this way, the operating system OS may, e.g.:

configure a single virtual address range for the applications APP, wherein this address range is separated from the address range used by the operating system OS; or configure for each application APP a respective virtual address range.

Substantially, in case the operating systems OS configures a plurality of virtual address ranges, the operating system OS sets the respective ASID when switching between the applications. For example, in this way, the applications APP may be developed separately from the operating systems OS. For example, each application development team may have associated a respective application address range.

For example, in the ARM AArch64 architecture are used so called translation tables (TTB) for this purpose. Specifically, a translation table permits to map a given virtual address to a respective physical address or a further virtual address. For example, in the ARM AArch64 architecture, two translation tables may be specified:
- a first translation table, which maps given virtual address ranges of the operating system OS to physical addresses; and
- a second table, which maps one or more virtual application addresses to virtual addresses of the operating system.

Accordingly, a virtual application address may first be mapped to a virtual operating system address and then to a respective physical address. For example, in an ARM AArch64 architecture, typically the OS translation table is implemented in the exception level EL1 and the application translation table is implemented in the exception level EL0.

Specifically, in the ARM AArch64 architecture, this mapping of virtual addresses (VA) to physical addresses (PA) of the communication system 114 is implemented directly within a Memory Management Unit (MMU) of the processing cores 102. Due to the fact that the physical address ranges of the communication system 114 are associated with memory ranges in the memories 104 and/or 104b, and the resources 106, it is thus possible to limit the read and write access rights of a given application APP or the operating system OS to given memory ranges and/or resources 106.

Accordingly, the ARM AArch64 architecture is based on a Virtual Memory System Architecture (VMSA). Conversely, the ARM AArch32 typically uses a Protected Memory System Architecture (PMSA) rather than a VMSA. Specifically, in case of AArch32 with PMSA, which is usually the case for Cortex®-R52 processors, the processing system 10 does not perform an address translation.

For example, in this case, the operating OS, usually a real-time operating system (RTOS), such as OSEK ("*Offene Systeme and deren Schnittstellen für die Elektronik in Kraftfahrzeugen*") or Autosar-OS, may be configured to define a number of statically assigned regions to task groups using directly physical addresses. As mentioned before, in an AArch32 PMSA architecture, the processing system 10 does not comprise a Memory Management Unit (MMU), which performs a virtual address translation. Conversely, in this case, the processing system 10 comprises a Memory Protection Unit (MPU). Specifically, instead of defining the mapping of virtual addresses to physical addresses, the MPU permits to specify, e.g., via a table, one or more memory regions in the physical address space and permits to specify the respective access rights and memory attributes. For example, this access-right table of the OS and the applications APP may be implemented in the exception level EL1.

FIG. 5 shows moreover that recently it has been proposed to perform a virtualization, wherein a hypervisor HYP is executed by the processing system 10. Specifically, the hypervisor HYP generally corresponds to a particular operating system, which permits the configuration of a plurality of m virtual machines VM1 . . . VMm, wherein each virtual machine VM may execute a respective operating system OS and one or more respective applications APP.

Thus, when using a VMSA architecture, each virtual machine VM1 . . . VMm may have associated a respective virtual address range, so called Intermediate Physical Addresses (IPA). For example, in the ARM AArch64 architecture, typically the virtual machine translation table is implemented in the exception level EL2. For example, in the ARM AArch64 architecture, the value Virtual Machine ID (VMID) identifies the number of a given ID. This value is used, because a given processing core 102 is not necessarily associated univocally to given respective virtual machine. For example, a plurality of virtual machines may be executed (via a time scheduling scheme) on the same processing core 102 or a given virtual machine may be executed (in parallel or sequentially) by a plurality of processing cores 102. Substantially, the hypervisor HYP sets the respective VMID of a given processing core 102 when switching from one virtual machine to another.

Similarly, when using a PMSA architecture, each virtual machine VM1 . . . VMm may have associated a respective physical address range. For example, in the ARM AArch32 PMSA architecture, typically the virtual machine access-right table is implemented in the exception level EL2. Typically, the respective access-right table in the exception level EL2 is again identified via a VMID, which is set by the hypervisor HYP for each processing core 102. Thus, also in the ARM AArch32 PMSA architecture, the memory space is covered by a 2-level protection, one controlled in exception level EL2 by the hypervisor HYP setting the address range boundaries of the virtual machines VM, and an underlying exception level EL1 under control of the operating systems OS setting the access rights of each task. Evidently, this implies that each software task (OS or APP) has to know a-priori the physical addresses of the various resources 106 it may access.

FIG. 6 shows in this respect a possible mapping of the translation tables in an ARM AArch64 architecture with a hypervisor HYP.

Specifically, considering that the physical address range includes addresses associated with the various circuits of the processing system 10 connected to the communication system 114, such as memories 104 and 104b, the resources 106, the DMA controller 110 and the processing cores 102, a given request transmitted to the communication system 114 has to indicate a physical address PA. As mentioned before, in an ARM AArch64 architecture, these physical addresses PA may be mapped via translation tables to virtual addresses via a MMU of each processing cores 102, the tables are configured within the MMU of the processing cores 102. For example, this may imply that the hypervisor HYP has to reconfigure these tables when switching between different virtual machines VM.

For example, in FIG. 6 are used the following translation tables:
- a table TTBR_EL2 for mapping a virtual address range of the hypervisor HYP to a physical address PA;
- for each virtual machine VM (or at least for the virtual machine VM currently executed by a given processing core 102) a table VTTBR_EL2 for mapping an intermediate physical address IPA of the respective virtual machine VM to a physical address range PA;
- for the operating system OS executed by a given virtual machine VM, a table TTBR_EL1 for mapping a virtual operating system address VA_OS to an intermediate physical address range IPA; and
- one or more tables TBR_EL0 for defining for a given operating system OS respective application address ranges for mapping a virtual application address VA_APP to a virtual operating system address VA_OS.

Generally, the table TTBR_EL2 is purely optional, because in case of a trusted hypervisor HYP, the hypervisor may also have access to the complete memory space.

Substantially, in an ARM AArch32 PMSA architecture, the translation tables VTTBR_EL2, TTBR_EL2 and TTBR_EL2 would be replaced with tables directly specifying the access-rights to given physical address ranges. In fact, in this case, a processing core 102 would directly provide a physical address (rather than a virtual address as in the VMSA architecture) and the MPU of the processing core 102 is configured to verify whether the request of the processing core 102 may be executed based on the access-rights specified for the VMID and optionally ASID provided by the processing core 102.

Thus, the translation tables in the ARM AArch64 architecture or the access-rights tables in the ARM AArch32 PMSA architecture, when managed in a suitable manner via the hypervisor HYP and optionally the operating system OS, provides an efficient solution for separating the access rights of one virtual machine VM (and optionally the applications APP executed by the virtual machine) from the access rights of another virtual machine VM. For example, in this way, one or more dedicated physical address ranges PA may be associated with each virtual machine VM and optionally with the hypervisor HYP.

As mentioned before, however also other bus masters may be connected to the communication interface 114, such as a bus master 1102 of a DMA controller or a bus master 1062 of another resource 106. Thus, these bus masters would have access to the complete physical memory range PA of the communication system 114.

In the ARM AArch64 architecture this problem is solved by providing one or more System Memory Management Units (SMMU), which permit to define translation tables for the other bus masters of the processing system 10. Thus, similarly to the translation tables described in the foregoing, the hypervisor HYP may also configure translation tables for the other bus masters. Similarly, in an ARM AArch32 PMSA architecture, the processing system 10 may comprise one or more System Memory Protection Units (SMPU) or similar address space protection circuits, which permit to define access-rights tables for the other bus masters of the processing system 10.

For example, in this way, access to the resources 106 may be managed. For example, assuming a processing system 10 running two virtual machines VM, which have to communicate via a SPI bus. In this case, the hypervisor HYP may configure the translation/access-rights tables in order to:
- in case the processing system 10 comprises at least two SPI interfaces 106, assign the address range associated with the first SPI interface to a first virtual machine VM and the address range associated with the second SPI interface to a first virtual machine VM; or
- in case the processing system 10 comprises one SPI interface 106, assign the address range associated with the SPI interface to the hypervisor HYP, which then may manage two virtual (software) SPI interfaces.

Thus, the ARM AArch64 and AArch32 architectures provide complete solutions for configuring virtual machines by configuring translations or access rights tables for the requests send by any bus master (processing core 102 or another bus master) to the communication system 114. However, in the context of a real-time control systems, the use of such translation or access rights tables may be rather inefficient.

Specifically, as mentioned before, the access control is implemented in a memory management unit or memory protection unit of the processing cores 102 and (for the other bus masters) in a system memory management unit/system memory protection unit. However, not all processing cores/processing systems comprise a memory management unit or memory protection unit, such as the ARM Cortex®-R52 processing core. In fact, such memory management units or memory protection units are complex, thus increasing the cost and power consumption of the processing system. Accordingly, memory management units or memory protection units are hardly feasible in low-cost and low-power solutions.

Moreover, in the ARM AArch64 and AARch32 architecture, such translation or access-rights tables are configured by storing the respective data to a volatile memory 104b, and each memory management unit or memory protection unit has to cache these data. However, in case of a cache miss, the cache controller associated with the memory management unit or memory protection unit has to obtain the missing data, which introduces a significant latency.

BRIEF SUMMARY

As mentioned before, various embodiments of the present disclosure relate to a processing system, such as an integrated circuit. Specifically, the processing system comprises a communication system having a given physical address range, and a plurality of processing cores, wherein each processing core comprises at least one microprocessor configured to execute software instructions. Specifically, each microprocessor has associated a (first) master interface circuit configured to forward read or write requests from the microprocessor to the communication system, wherein the read or write requests comprise a physical address of the physical address range of the communication system. In various embodiments, the processing system comprises a first/slave circuit, such as a resource/peripheral or a memory controller, having associated a slave interface circuit configured to selectively forward read or write requests addressed to a given address sub-range from the communication system to the first circuit.

In various embodiments, the processing system comprises in addition to the microprocessors, at least one additional master circuit, a second/master circuit having associated a (second) master interface circuit configured to forward read or write requests from the second circuit to the communication system.

Specifically, the master interface circuit of a microprocessor has associated a first register for storing a respective first virtual machine ID. Specifically, in various embodiments, the master interface circuit of a microprocessor is configured to read the first virtual machine ID from the first register and insert the first virtual machine ID into the read or write requests forwarded from the microprocessor to the communication system, the virtual machine ID is transmitted with the requests.

However, in various embodiments, also the second master interface circuit has associated a second register for storing a second virtual machine ID and is configured to read the second virtual machine ID from the second register and insert the second virtual machine ID into the read or write requests forwarded from the second circuit to the communication system. For example, in various embodiments, the second circuit is a DMA controller, wherein a respective virtual machine ID may be stored for each DMA channel.

Accordingly, the requests sent by the bus masters comprise, in addition to the target address, also a virtual machine ID identifying the sender. Optionally, the requests may also comprise an Address Space ID.

Accordingly, in various embodiments, the slave interface circuit may determine whether the request is authorized.

Specifically, for this purpose, in various embodiments, the slave interface circuit has associated a register for storing a third virtual machine ID associated with the given first address sub-range. Specifically, in this case, the slave interface circuit may be configured to receive a read or write request addressed to the given address sub-range from the communication system, extract from the received request a virtual machine ID, read the third virtual machine ID from the third register, and determine whether the virtual machine ID extracted from the received request corresponds to the third virtual machine ID. For example, in response to determining that the virtual machine ID extracted from the received request corresponds to the third virtual machine ID, the slave interface circuit may forward the read or write request to the first circuit. Conversely, in response to determining that the virtual machine ID extracted from the received request does not correspond to the third virtual machine ID, the slave interface circuit may inhibit forwarding the read or write request to the first circuit, e.g., reject the read or write request.

Generally, the slave interface may also manage separate read and write access rights. For this purpose, the third register may be configured to store a read virtual machine ID and a write virtual machine ID. In this case, the slave interface circuit may determine whether the received request is a read request or a write request and, in response to determining that the received request is a read request, determine whether the virtual machine ID extracted from the received request corresponds to the read virtual machine ID. Conversely, in response to determining that the received request is a write request, the slave interface circuit may determine whether the virtual machine ID extracted from the received request corresponds to the write virtual machine ID.

Accordingly, the first, second and third register may be used to define whether the microprocessor, the first (slave) circuit and the second (master) circuit belong to the same virtual machine. For this purpose, the first register, the second register and the third register are programmable via software instructions executed by the microprocessor. Specifically, in various embodiments, the configuration of the virtual machine IDs may only be performed via a hypervisor. Specifically, in this case, the processing system may be configured to execute on the plurality of processing cores a hypervisor and one or more virtual machines, wherein with each virtual machine is associated a respective virtual machine ID, and wherein the processing system is configured such that the first register, the second register and the third register are programmable via the hypervisor and not programmable via the one or more virtual machines.

For example, such a hypervisor may be configured to store a first virtual machine ID value to the first register associated with the master interface circuit of a first processing core, a second virtual machine ID value to the first register associated with the master interface circuit of a second processing core, and the first virtual machine ID value to the second register (of the first/slave circuit) and the third register (of the second/master circuit). Next, the hypervisor may start a first virtual machine on the first processing core, and a second virtual machine on the second processing core. Accordingly, in this case, the slave interface circuit would be configured to forward read and/or write requests received from the first virtual machine/first processing core and the second circuit to the first circuit, but to inhibit the forwarding of read and/or write requests received from the second virtual machine/second processing core.

Accordingly, in various embodiments, the requests should also identify requests sent by the hypervisor. For example, for this purpose, when a processing core is executing the hypervisor, the respective first master interface circuit may be configured to insert into the read or write requests forwarded from the respective microprocessor to the communication system a given virtual machine ID associated with the hypervisor and/or one or more bits indicating a privilege information. For example, in order to set the virtual machine ID of a microprocessor, the hypervisor may send requests via the communication system or a dedicated co-processor bus. The virtual machine ID of a slave interface circuit may be programmed by either sending requests to the same slave interface circuit or to one or more dedicated slave interface circuits. Similarly, the virtual machine ID of a master interface circuit may be programmed by either sending requests to a slave interface circuit univocally associated with the master interface circuit or to one or more dedicated slave interface circuits. Accordingly, such slave interface circuits may be configured to receive a read or write request addressed to a respective address sub-range, extract from the received request a virtual machine ID and/or a privilege information and, in response to determining that the virtual machine ID extracted from the received request corresponds to a determined virtual machine ID and/or the privilege information has a given value, forward the read or write request to the respective register. The determined virtual machine ID may be predetermined.

In an embodiment, a processing system comprises a communication system having a physical address range. A plurality of processing cores are coupled to the communication system. Each processing core comprises: a microprocessor, which, in operation, executes software instructions; and a first master interface circuit associated with the processing core, wherein the first master interface circuit, in operation, forwards read or write requests from said microprocessor to said communication system, said read or write requests including a physical address of said physical address range. The processing system includes a first circuit; a first slave interface circuit associated with the first circuit, wherein the first slave interface circuit, in operation, selectively forwards read or write requests addressed to an address sub-range of the physical address range from said communication system to said first circuit; a second circuit; a second master interface circuit associated with the second circuit, wherein the second master interface circuit, in operation, forwards read or write requests from said second circuit to said communication system; a first register, associated with the first master interface circuit, wherein the first register, in operation, stores a first virtual machine ID; a second register, associated with the second master interface circuit, wherein the second register, in operation, stores a second virtual machine ID; and a third register, associated with the first slave interface circuit, wherein the third register, in operation, stores a third virtual machine ID. Said first register, said second register and said third register are programmable via software instructions executed by said microprocessor. The first master interface circuit, in operation, reads said first virtual machine ID from said first register and inserts said first virtual machine ID into said read or write requests forwarded from said microprocessor to said communication system. The second master interface circuit, in operation, reads said second virtual machine ID from said second register and inserts said second virtual machine ID into said read or write requests forwarded from said second circuit to said communication system. The first slave interface circuit, in operation, responds to a read or write request received from the communication system and addressed to an address of the address sub-range of the physical address range by: extracting a virtual machine ID from said received request; reading said third virtual machine ID from said third register; determining whether said virtual machine ID extracted from said received request corresponds to said third virtual machine ID; in response to determining that said virtual machine ID extracted from said received request corresponds to said third virtual machine ID, forwarding said read or write request to said first circuit; and in response to determining that said virtual machine ID extracted from said received request does not correspond to said third virtual machine ID, inhibiting forwarding of said read or write request to said first circuit.

In an embodiment, a device comprises: a plurality of processing systems; and a communication bus, which, in operation, couples the plurality of processing systems together, each processing system of the plurality of processing systems includes: a communication system having a physical address range; a plurality of processing cores coupled to the communication system, each processing core comprising: a microprocessor, which, in operation, executes software instructions; and a first master interface circuit associated with the processing core, wherein the first master interface circuit, in operation, forwards read or write requests from said microprocessor to said communication system, said read or write requests including a physical address of said physical address range; a first circuit; a first slave interface circuit associated with the first circuit, wherein the first slave interface circuit, in operation, selectively forwards read or write requests addressed to an address sub-range of the physical address range from said communication system to said first circuit; a second circuit; a second master interface circuit associated with the second circuit, wherein the second master interface circuit, in operation, forwards read or write requests from said second circuit to said communication system; a first register, associated with the first master interface circuit, wherein the first register, in operation, stores a first virtual machine ID; a second register, associated with the second master interface circuit, wherein the second register, in operation, stores a second virtual machine ID; and a third register, associated with the first slave interface circuit, wherein the third register, in operation, stores a third virtual machine ID, wherein said first register, said second register and said third register are programmable via software instructions executed by said microprocessor; said first master interface circuit, in operation, reads said first virtual machine ID from said first register and inserts said first virtual machine ID into said read or write requests forwarded from said microprocessor to said communication system; said second master interface circuit, in operation, reads said second virtual machine ID from said second register and inserts said second virtual machine ID into said read or write requests forwarded from said second circuit to said communication system; and said first slave interface circuit, in operation, responds to a read or write request received from the communication system and addressed to an address of the address sub-range of the physical address range by: extracting a virtual machine ID from said received request; reading said third virtual machine ID from said third register; determining whether said virtual machine ID extracted from said received request corresponds to said third virtual machine ID; in response to determining that said virtual machine ID extracted from said received request corresponds to said third virtual machine ID, forwarding said read or write request to said first circuit; and in response to determining that said virtual machine ID extracted from said received request does not correspond to said third virtual machine ID, inhibiting forwarding of said read or write request to said first circuit.

In an embodiment, a method comprises controlling communication over a communication system having a physical address range and coupling a processing core, a first circuit and a second circuit together. The controlling includes: starting a hypervisor on a microprocessor of the processing core; storing, under control of the hypervisor, a first virtual machine ID value to a first register associated with a first master interface circuit associated with the microprocessor; storing, under control of the hypervisor, a second virtual machine ID value to a second register associated with a second master interface circuit associated with the second circuit; storing, under control of the hypervisor executing on the first processing core, a third virtual machine ID value to a third register; inserting, by the first master interface circuit, the stored first virtual machine ID into read or write requests forwarded from the first processing core to the communication system; inserting, by the second master interface circuit, the stored second virtual machine ID into read or write requests forwarded from the second circuit to the communication system; and selectively forwarding, under control of a slave interface circuit associated with the first circuit, a read or write request addressed to an address sub-range of the physical address range from the communication system to the first circuit. The selectively forwarding includes: extracting a virtual machine ID from the request addressed to the address sub-range; reading the third virtual machine ID from the third register; determining whether the virtual machine ID extracted from the request corresponds to said third virtual machine ID; in response to determining that said virtual machine ID extracted from the request corresponds to said third virtual machine ID, forwarding the request to said first circuit; and in response to determining that said virtual machine ID extracted from said request does not correspond to said third virtual machine ID, inhibiting forwarding of said request to said first circuit.

In an embodiment, a non-transitory computer-readable medium's contents configure a computing system to control communications over a communication system with a physical address range, the communication system coupling a processing core, a first circuit and a second circuit together. The controlling communications includes: starting a hypervisor on a microprocessor of the processing core; storing, under control of the hypervisor, a first virtual machine ID value to a first register associated with a first master interface circuit associated with the microprocessor; storing, under control of the hypervisor, a second virtual machine ID value to a second register associated with a second master interface circuit associated with the second circuit; storing, under control of the hypervisor executing on the first processing core, a third virtual machine ID value to a third register; inserting, by the first master interface circuit, the stored first virtual machine ID into read or write requests forwarded from the first processing core to the communication system; inserting, by the second master interface circuit, the stored second virtual machine ID into read or write requests forwarded from the second circuit to the communication system; and selectively forwarding, under control of a slave interface circuit associated with the first circuit, a read or write request addressed to an address sub-range of the physical address range from the communication system to the first circuit. The selectively forwarding includes: extracting a virtual machine ID from the request addressed to the address sub-range; reading the third virtual machine ID from the third register; determining whether the virtual machine ID extracted from the request corresponds to said third virtual machine ID; in response to determining that said virtual machine ID extracted from the request corresponds to said third virtual machine ID, forwarding the request to said first circuit; and in response to determining that said virtual machine ID extracted from said request does not correspond to said third virtual machine ID, inhibiting forwarding of said request to said first circuit.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
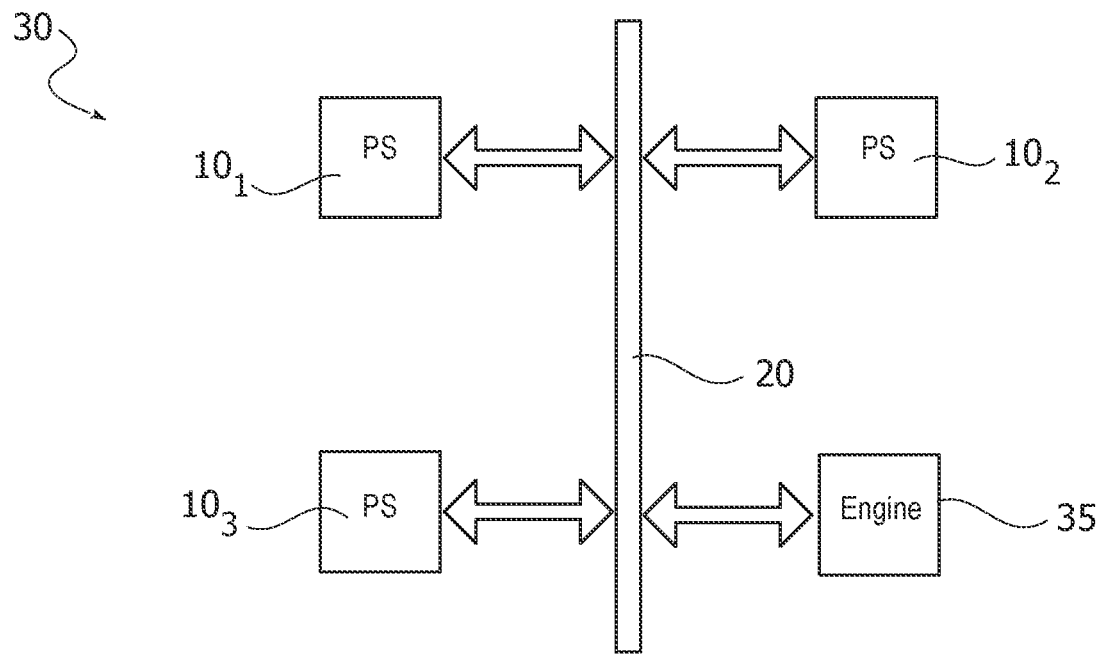
FIG. 1 shows an example of an electronic system comprising a plurality of processing systems.
Figure 2:
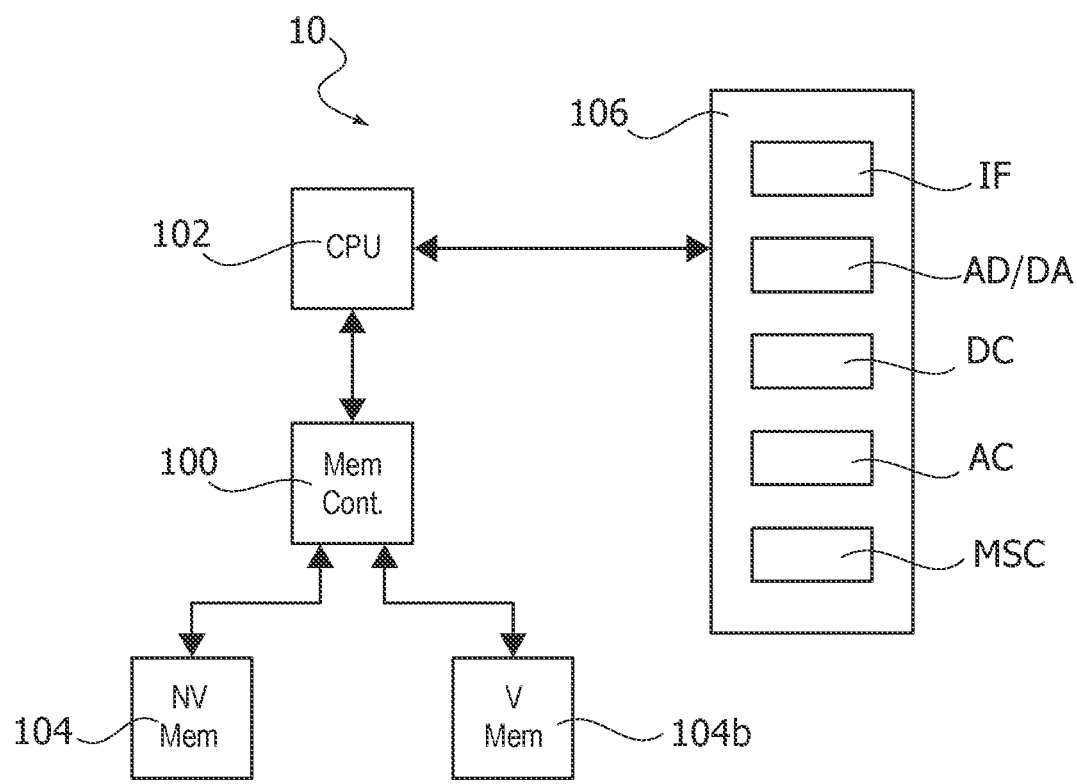
FIG. 2 shows an example of a processing system, such as a microcontroller.
Figure 6:
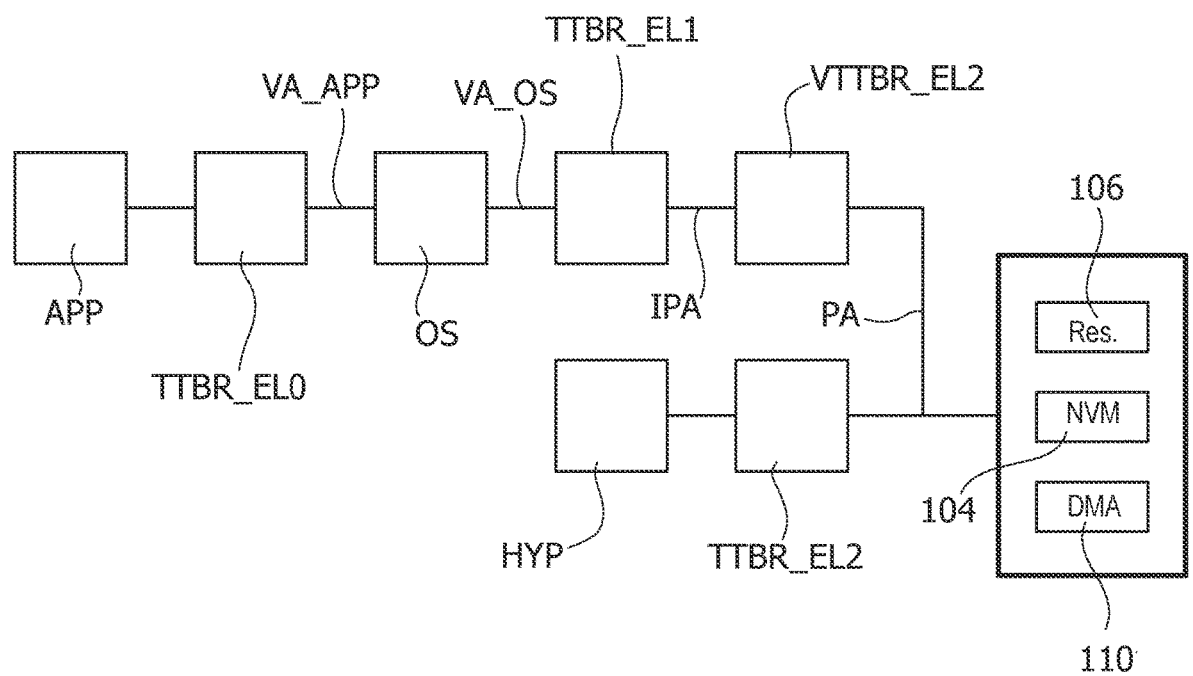
FIG. 6 shows an example of the configuration of translation tables used to configure virtual addresses of the virtual machines of FIG. 5.

In the following FIGS. 7 to 17 parts, elements or components which have already been described with reference to FIGS. 1 and 6 may be denoted by the same references previously used in such Figures; the description of such previously described elements will not be repeated in the following in order not to overburden the present detailed description.

As mentioned before, various embodiments of the present disclosure relate to solutions for managing access rights in a multi-core processing system.

Figure 3:
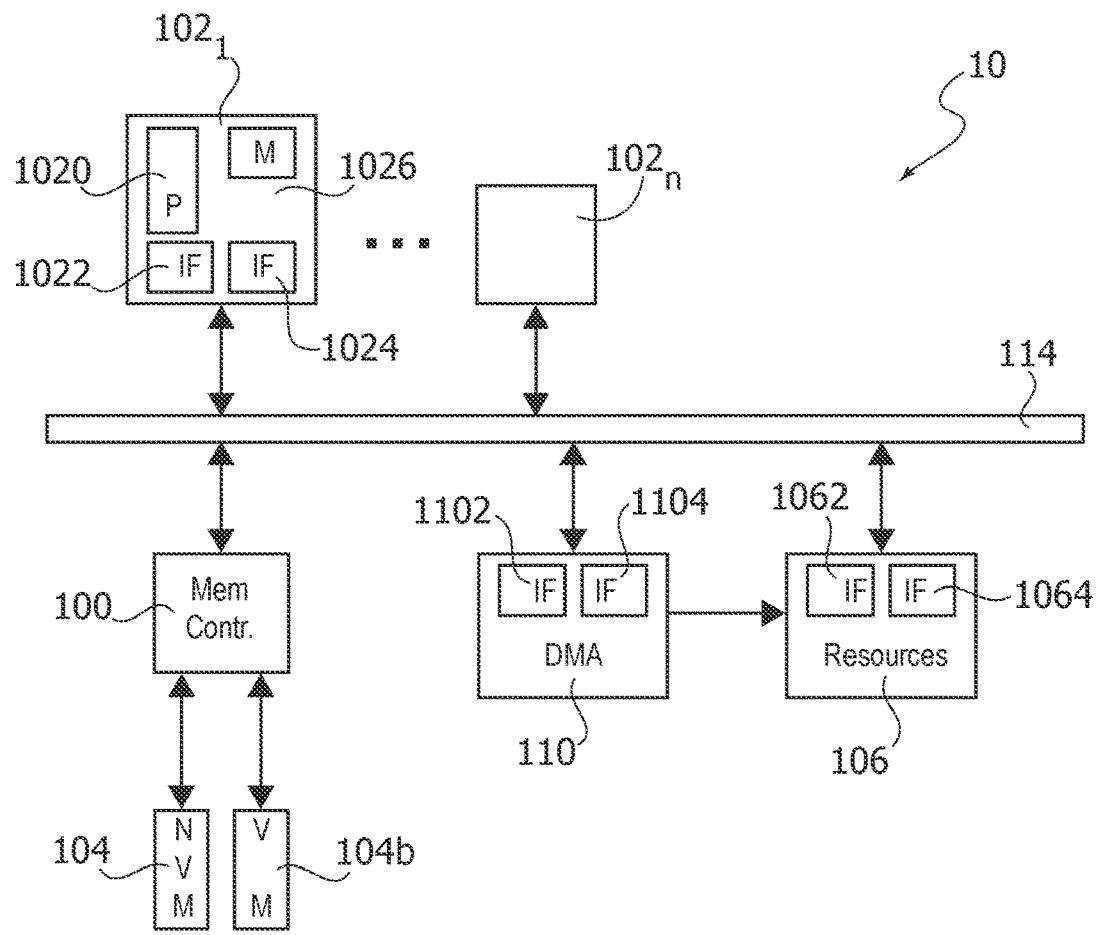
FIG. 3 shows an example of a multi-core processing system.
Figure 4:
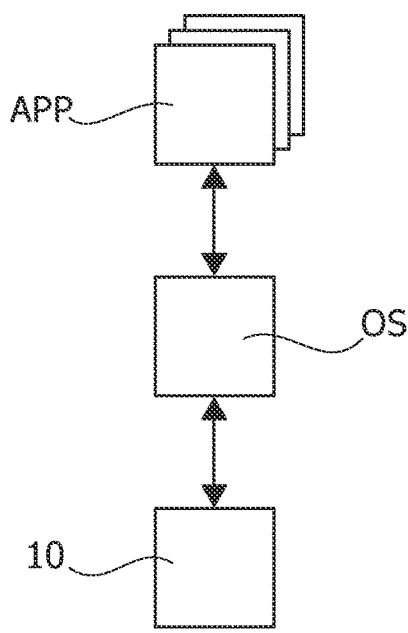
FIG. 4 shows an example of the software executed by a processing system, wherein the software is divided into an operating system and applications.
Figure 5:
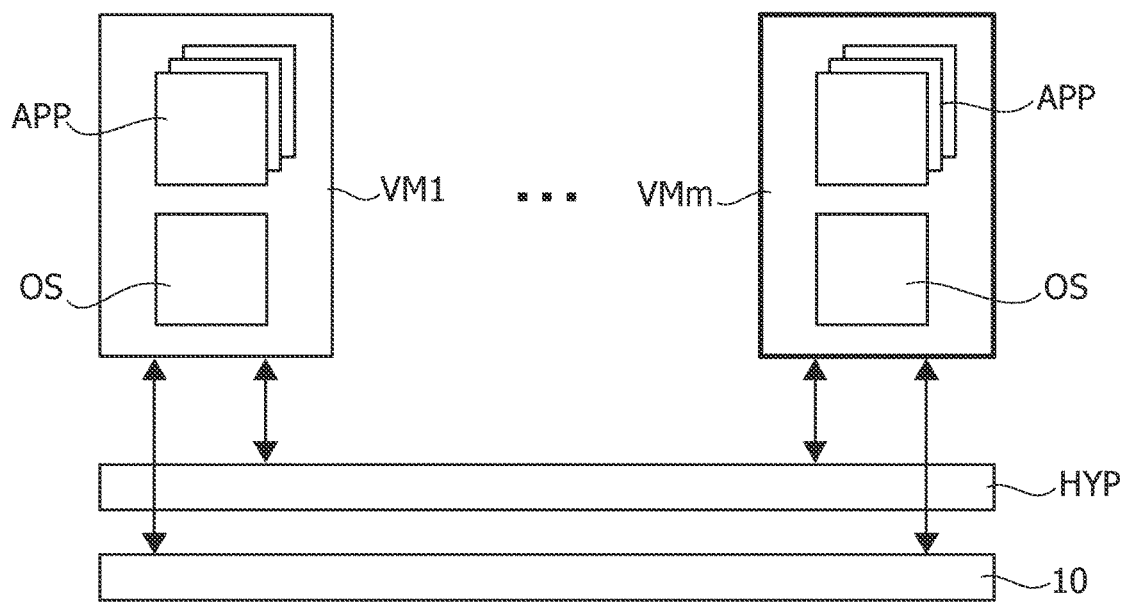
FIG. 5 shows an example of the software executed by a processing system, wherein the software is divided into a hypervisor and a plurality of virtual machines.
Figure 7:
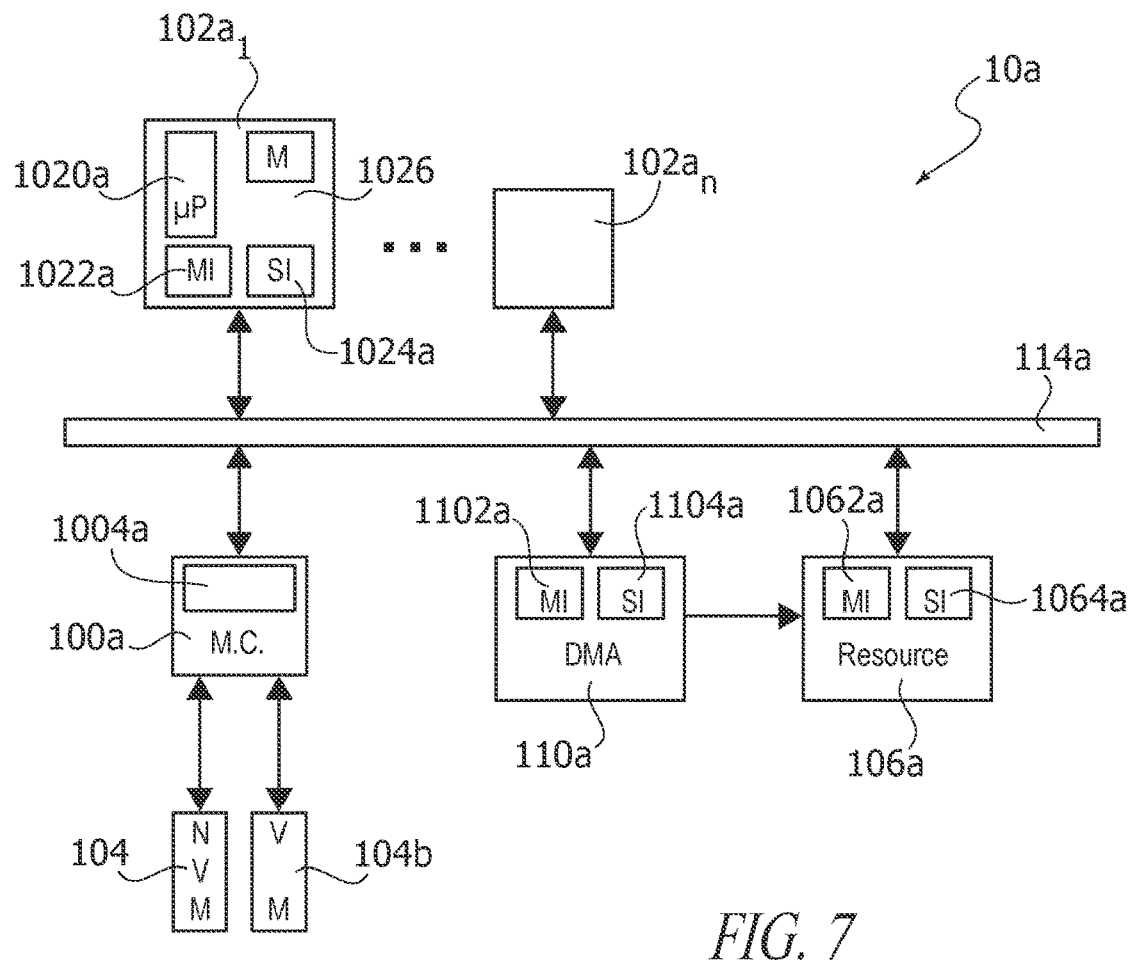
FIG. 7 shows an embodiment of a multi-core processing system according to the present disclosure.

For example, FIG. 7 shows an embodiment of a processing system $10a$ according to the present disclosure. Specifically, the general architecture of the processing system $10a$ corresponds to the architecture described with respect to FIG. 3.

Specifically, also in this case, the processing system $10a$ comprises:

a communication system $114a$, such as a bus or a NoC;
a plurality of processing cores $102a$, such as processing cores $102a_1$ ... $102a_n$, wherein each processing core 102 comprises a software programmable microprocessor $1020a$, a master interface $1022a$ and a slave interface $1024a$; and
at least one resource 106 having a slave interface $1064a$.

Figure 8:
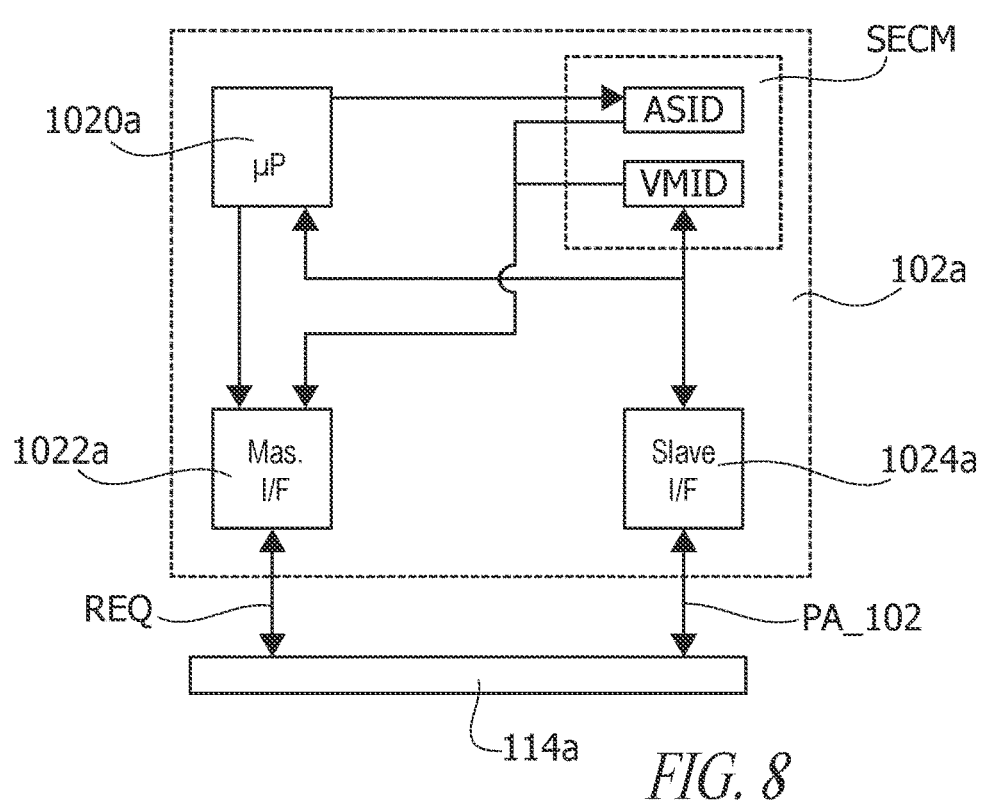
FIG. 8 shows an embodiment of a processing core according to the present disclosure.
Figure 9:
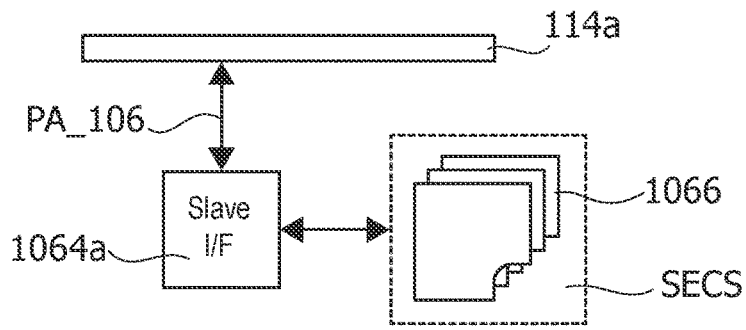
FIG. 9 shows an embodiment of a resource comprising a slave interface using firewall configuration data.

Generally, a slave interface has associated a respective physical address or address range. For example, this is shown in FIGS. 8 and 9, wherein the slave interface $1024a$ of a processing core $102a$ has associated a respective physical address or address range PA_102 and wherein the slave interface $1064a$ of a resource $106a$ has associated a respective physical address or address range PA_106. Generally, each slave interface has associated a different and univocal address or address range within the physical address range of the communication system $114a$. For example, the various slave interfaces $1024a$ and $1064a$ of processing cores $102a_1$ ... $102a_n$ and resources 106 have associated non-overlapping addresses or address ranges PA_102 and PA_106.

Accordingly, a master interface is configured to send read or write requests REQ to the communication system $114a$ and eventually receive a respective response to the request from the communication system $114a$. For example, this is shown in FIG. 8, wherein the master interface $1022a$ of a processing $102a$ is configured to send a request REQ to the communication system $114a$. Specifically, such a read or write request REQ will comprise a physical address PA associated with the slave interface to which the request REQ should be send.

Accordingly, in this way, a microprocessor may send a write or read request REQ to a given resource 106 by including in the requests REQ a physical address associated with the slave interface $1064a$ of the resource 106. For example, typically a slave interface manages plural addresses, because the addresses may be mapped to different functions, such as configuration registers, registers containing the data to be transmitted or the data received, etc.

However, also a first microprocessor 1020*a* may send a request REQ to a second microprocessor by including in the request REQ a physical address PA_106 associated with the slave interface 1024*a* of the second microprocessor.

Generally, while the master interfaces and slave interfaces of the various circuits are shown as separate logic blocks, indeed these interfaces may reuse the same physical interface for the communication with the communication system 114*a*.

As shown in FIG. 7, in various embodiments, the processing system 10*a* comprises also a memory controller 100*a* configured to be connected to an internal and/or external volatile memory 104*b* and/or non-volatile memory 104. For example, as described in the foregoing, the memory 104 may be configured to store the software instructions to be executed by the processing cores 102*a* and the memory 104*b* may be used to store temporary processing results.

In various embodiments, the processing system 10*a* may also comprise a DMA controller 110*a*.

Specifically, as shown in FIG. 8, in various embodiments, each processing core 102*a* comprises a register for storing a Virtual Machine ID (VMID) and optionally a register for storing an Address Space ID (ASID).

As shown in FIG. 8, in various embodiments, the register VMID is programmable via the slave interface 1024*a* of the respective processing core 102*a*. Generally, while FIG. 8 shows that the slave interface is connected to the communication system 114*a*, indeed the communication system 114*a* may comprise in addition to the system bus or NoC, also an additional co-processor bus, e.g., connecting the microprocessors 1020*a* of the same processing core 102*a* or all processing cores 102*a*. For example, in an ARM core, the respective register used to store the VMID is called VSCTLR.

Figure 11:
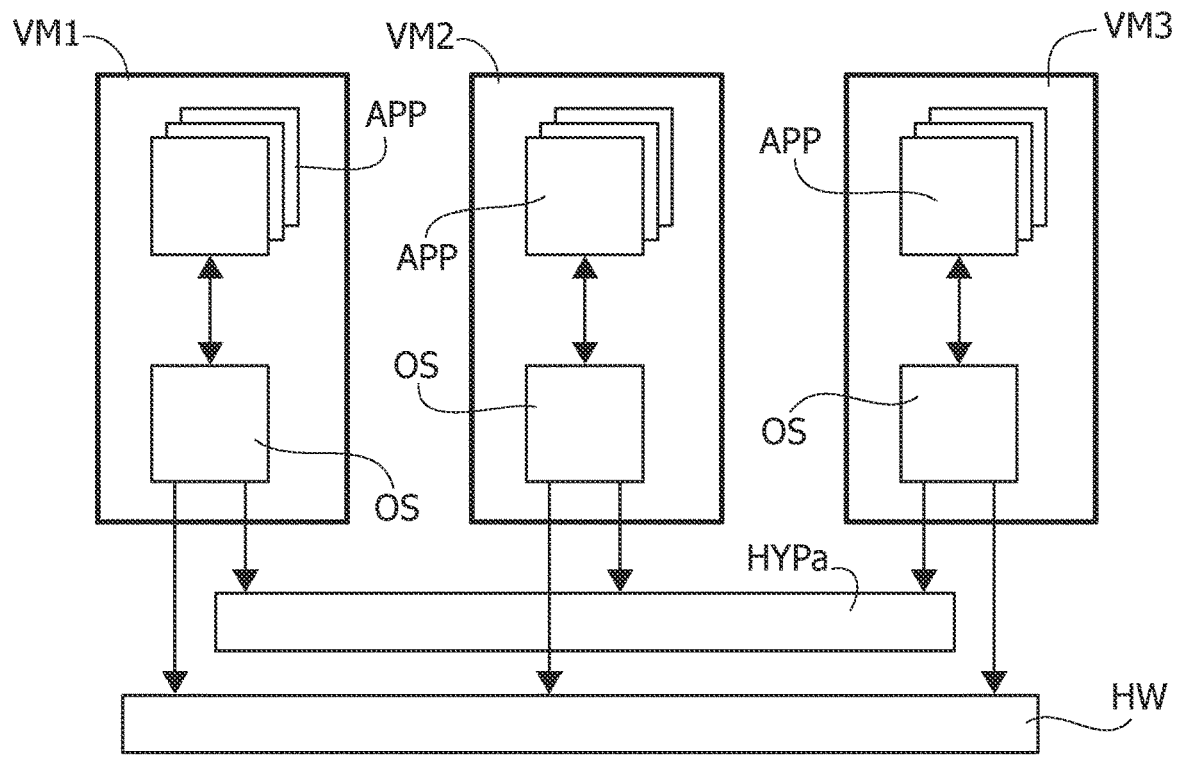
FIG. 11 shows an embodiment of the software executed by a processing system, wherein the software is divided into a hypervisor and a plurality of virtual machines.

Specifically, FIG. 11 shows a typical scenario of the software executed by the processing system 10*a*. Specifically, in the embodiment considered, the software includes a hypervisor HYPa and a plurality of virtual machines VM, such as three virtual machines VM1, VM2 and VM3. For example, the processing system 10*a* may comprise four processing cores 102*a*, wherein:
- the virtual machine VM1 may be a complex Electronic Control Unit (ECU);
- the virtual machines VM2 and VM3 may related to a multimedia system and a navigation system, respectively.

For example, due to the fact that the multimedia system and the navigation system may use the same display device, only one of these machines may be executed at a given moment. For example, in this case, the hypervisor HYPa may be executed on the first processing core 102*a* and the hypervisor HYPa may start the virtual machine VM1 on the second and third processing cores 102*a*, and the virtual machines VM2 on the fourth processing core 102*a*. Moreover, when receiving a given command from the virtual machines VM2, the hypervisor HYPa may stop the virtual machines VM2 and start the virtual machines VM3 on the fourth processing core 102*a*.

Generally, the number of processing cores 102*a* and the number of virtual machines VM may depend on the application needs. For example, typically real time control systems should be assigned to one or more dedicated processing cores, while other virtual machines and even the hypervisor HYP may be executed based on a time scheduling mechanism similar to software tasks managed by an operating system OS.

As mentioned before, the register VMID should comprise the ID of the virtual machine executed by the respective processing core 102*a*. For example, considering the exemplary scenario of FIG. 11, the following VMIDs may be used: VMID0 (e.g., 0) for the hypervisor HYPa and VMID1 . . . VMID3 (e.g., 1 . . . 3) for the virtual machines VM1 . . . VM3. Accordingly, in this case, the boot loader would start the hypervisor HYPa on the first processing core 102*a* and the hypervisor HYPa could program the VMID of the other processing cores 102*a* and then start the respective virtual machines on the other processing cores, e.g.,
- program the value VMID1 for the second and third processing cores 102*a*; and
- program the value VMID2 for the fourth processing cores 102*a*.

Conversely, when a hypervisor HYPa executed by a processing core 102*a* determines that a processing core 102*a* (e.g., the fourth processing) should switch from a given first virtual machine (e.g., VM2) to a given second virtual machine (e.g., VM3), the hypervisor HYPa may:
- stop the first virtual machine, and in an embodiment, also storing the context information of the processing core associated with the first virtual machine;
- reprogram the register VMID of the processing core 102*a* and store the VMID of the second virtual machine VM2 to the register VMID, and in an embodiment, also restoring the context information of the processing core associated with the second virtual machine; and
- start or resume operation of the second virtual machine VM1.

Conversely, when supported, the register ASID is programmable directly or indirectly via the respective microprocessor 1020*a* of the processing core 102. Specifically, as will be described in greater detail in the following, the Address Space ID may be used to organize the address assigned to a given virtual machine VM in smaller subsets. For example, a first Address Space ID may be assigned to an operating system OS of the virtual machine VM executed by the processing core 102*a* and one or more additional Address Space IDs may be assigned to applications APP of the virtual machine VM executed by the processing core 102*a*. Accordingly, in various embodiments, the register ASID is programmable via an operating system of the virtual machine VM executed by a given processing core 102.

Specifically, in the ARM AArch64 or AArch32 architectures similar registers where provided. Specifically, these registers were used to perform the address translation via the translation tables and the memory management unit of the processing core or directly the access-control of physical addresses via the memory protection unit. Conversely, in various embodiments of the present disclosure, the master interface 1022*a* of a processing core 102*a* is configured to transmit with the request REQ not only the physical address PA associated with the target slave client, but also the content of the register VMID and the register ASID (when used).

Thus, with respect to FIG. 9, a slave interface 1064*a* of a resource 106*a* will receive a request REQ comprising a physical address PA_106 associated with the slave interface 1064*a*. However, this request comprises also the data VMID and optionally ASID of the processing core 102*a* having sent the request REQ.

Accordingly, in various embodiments, the slave interface 1064*a* comprises a firewall configured to compare the data VMID and optionally ASID included in the request REQ with firewall configuration data 1066 defining whether a given VMID (or combination of VMID and ASID) may send a request to the slave interface 1064*a*.

In various embodiments, these firewall configuration data 1066 may also specify separately whether the given VMID (or combination of VMID and ASID) may send a read request and/or may send a write request. For example, in case the slave interface 1064*a* manages only a single address or address range PA_106, the configuration data may comprise:
- a first field for storing a VMID (or combinations of VMID and ASID) which may send a read request; and
- a second field for storing a VMID (or combinations of VMID and ASID) which may send a write request.

Thus, in case a given virtual machine (or process as identified by a combination of VMID and ASID) has read and write access to a given address range, the same VMID (or combination of VMID and ASID) would be stored to both the first and the second field.

Conversely, in order to exchange data between different virtual machines or processes, so called Inter Process Communication (IPC), a first VMID (or combination of VMID and ASID) may be stored to the first field and a second VMID may be stored to the second field, whereby the first VMID may read data from the address range and the second VMID may write data to the address range (peer-to-peer communication).

In various embodiments, the first field may also be used to store a value identifying a "wildcard," which indicates that all VMIDs or processes may read data from the respective address range. For example, this permits to implement a broadcast communication from one virtual machine to all other virtual machines.

Similarly, in case the slave interface 1064*a* is configured to manage a plurality of address ranges PA_106, the configuration data may comprise for each managed address range:
- a respective first field for storing a VMID (or combinations of VMID and ASID) which may send a read request; and
- a respective second field for storing a VMID (or combinations of VMID and ASID) which may send a write request.

Accordingly, in case the firewall of the interface 1064*a* determines that the VMID and optionally the ASID included in the request REQ may access the interface 1064*a*, the firewall forwards the respective request to resource 106. Conversely, in case the firewall of the interface 1064*a* determines that the VMID and optionally the ASID included in the request REQ may not access the interface 1064*a*, the firewall/slave interface may:
- disregard the requests REQ; or
- send an error to the processing core 102 having sent the request REQ and/or send an error to a determined address, e.g., associated with the slave interface of an error monitoring module or a processing core 102 executing the hypervisor HYPa, and/or directly to a module in charge of collecting and handling system errors. The determined address may be predetermined.

Thus, in an embodiment the security configuration of the communication between a master interface and a slave interface comprises:
- the security configuration data SECM of the master interface, which comprise the data VMID and optionally ASID included in the request REQ; and
- the security configuration SECS of the slave interface, which include the firewall configuration data 1066 defining the access rights to the slave interface, in particular the physical address range managed by the slave interface, based on the data VMID and optionally ASID included in the request REQ.

Accordingly, in the embodiments shown in FIGS. 7 to 9, the processing core 102*a* does not comprise a memory management unit (configured to perform an address translation operation) or a memory management unit (configured to verify the access rights), but each processing core 102*a* may send requests REQ to the communication systems 114*a*, wherein the requests may comprise physical addresses of the complete address range associated with the communication system 114*a*. Conversely, the access protection is implemented via a firewall within the slave interface 1064*a* of the target resource 106*a*. However, in general, the processing cores 102*a* may also comprise an additional MMU or MPU.

Generally, the above operation of the master interface 1022*a* and slave interface 1064*a* may also be implemented in other master and slave interfaces.

For example, in various embodiments, each slave interface, such as the slave interfaces 1024*a* of the processing cores 102*a* and a slave interface 1004*a* of the memory controller 100*a*, may comprise a firewall permitting a configuration of the VMID (or combinations of VMID and ASID), which may send read and/or write requests to the respective slave interface.

Similarly, also other master interfaces, such as the master interfaces 1062*a* of the resources 106*a* or other bus masters, may comprise registers for setting a VMID and optionally an ASID. Generally, the inventors have observed that it is usually sufficient that the other master interfaces comprise only the register VMID, because the other bus masters are usually not application/process aware and the register ASID may be omitted. However, in general, a master interface of a resource 106*a* (or another bus master) could also comprise a register ASID for storing an Address Space ID.

Figure 10:
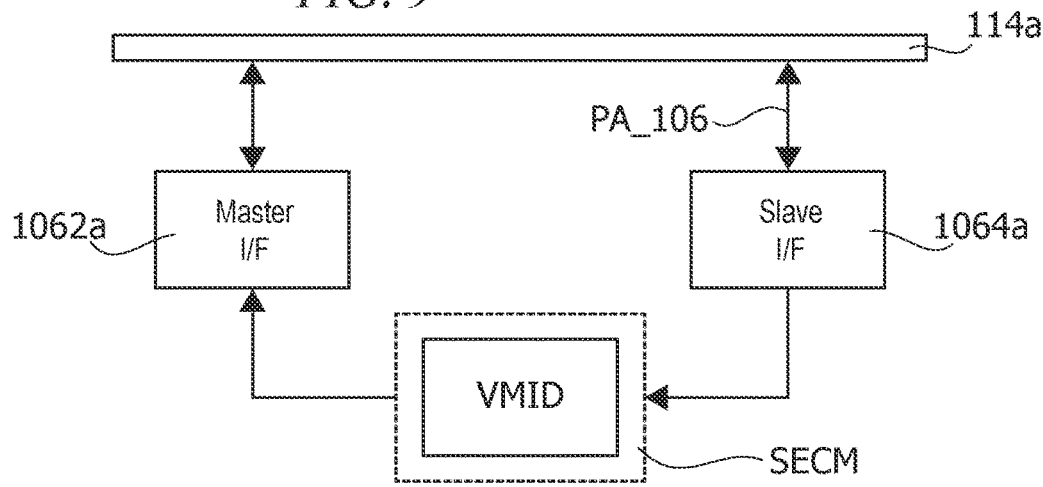
FIG. 10 shows an embodiment of a resource comprising a master interface and a slave interface.

For example, FIG. 10 shows an embodiment of a resource 106*a* comprising also a master interface 1062*a*. Specifically, in the embodiment considered, the resource 106 comprises a register VMID for storing a Virtual Machine ID. Specifically, similar to the processing cores 102*a*, the content of the register VMID is programmable by sending a write request REQ containing the address PA_106 associated with the register VMID. For example, in this way, a hypervisor HYPa execute by a processing core 102*a* may send a request REQ for programming the register VMID of a resource 106*a*.

Thus, by configuring the firewall of the slave interface managing a given physical address, the firewall of the slave interface may determine whether the request was sent from a permitted VMID (or combination of VMID and ASID).

Generally, the configuration of the virtual machines VM, which includes the programming of the security configuration data SECM (in particular the registers VMID) of the various bus masters and the setting of the security configuration data SECS (in particular the firewall configuration data 1066) of the slave interfaces, may only be performed by the hypervisor HYPa. For this purpose, in various embodiments, each slave interfaces of a given circuit manages at least two address ranges:
- an address range associated with the security configuration data, which include:
  - the security configuration data SECS (firewall configuration data 1066) of the slave interface, and
  - in case the circuit comprises also a master interface, the security configuration data SECM (register VMID and the optional register ASID) of the master interface;

one or more address ranges used to control the operation of the circuit.

Generally, instead of implementing the firewall in the slave interfaces, the firewall could also be implemented in the communication system 114a, in particular at each interface of the communication system 114a connecting the communication system 114a to a respective slave interface. For example, this has the advantage that conventional IP blocks of processing cores 102a and resources 106a do not need to be modified, but additional firewall circuits may be added between a conventional communication system 114a and the various circuits connected to the communication system 114a. Thus, a respective firewall circuits may also be positioned between each slave circuit and a respective interface of the communication system 114a. In fact, in various embodiments, each firewall circuit is configured to monitor (and possible reject) requests forwarded from the communication system 114a to a slave interface, rather than monitoring the request forwarded from a master interface to the communication system 114a, as would at most perform a MMU or MPU.

Thus, in general, the term "slave interface circuit" has to be construed in the sense that this circuit relates to the connection point of a slave interface of a circuit to the interface of the communication system 114a and may comprise the slave interface of the circuit and/or the respective interface of the communication system 114a. Accordingly, in general, each of these slave interface circuits has associated an address range (associated with one or more respective configuration registers) for storing the security configuration data SECS (firewall configuration data 1066) of the respective slave interface circuit. For example, when implementing the firewall in the communication system 114a, the communication system 114a itself may comprise a slave interface permitting the configuration of the various security configuration data SECS.

Similarly, instead of implementing the mechanism which adds the VMID and optionally the ASID to a request REQ in the master interface of a circuit, a circuit may be provided between the master interface and the respective interface of the communication system 114a.

Thus, in general, the term "master interface circuit" may be construed in the sense that this circuit relates to the connection point of a master interface of a circuit to the interface of the communication system 114a and may comprise the master interface of the circuit and/or the respective interface of the communication system 114a. Accordingly, in general, each of these master interface circuits has associated an address range (associated with one or more respective configuration registers) for storing the security configuration data SECM (register VMID and the optional register ASID) of the respective master interface circuit. For example, also in this case, the communication system 114 itself may comprise a slave interface permitting the configuration of the various security configuration data SECM.

In various embodiments, the firewall configuration data 1066 are configured to store for each of the one or more address ranges managed by a slave interface circuit at least one VMID (and optionally one or more ASID) indicating which VMID (and optionally ASID) may access the respective address range. Accordingly, the slave interface circuit is configured to extract from the request REQ the address and the VMID (and optionally the ASID), determine the respective firewall configuration data 1066 for the extracted address and compare the VMID (and optionally ASID) stored for the determined firewall configuration with the VMID (and optionally ASID) extracted from the request.

Figures 12, 13:
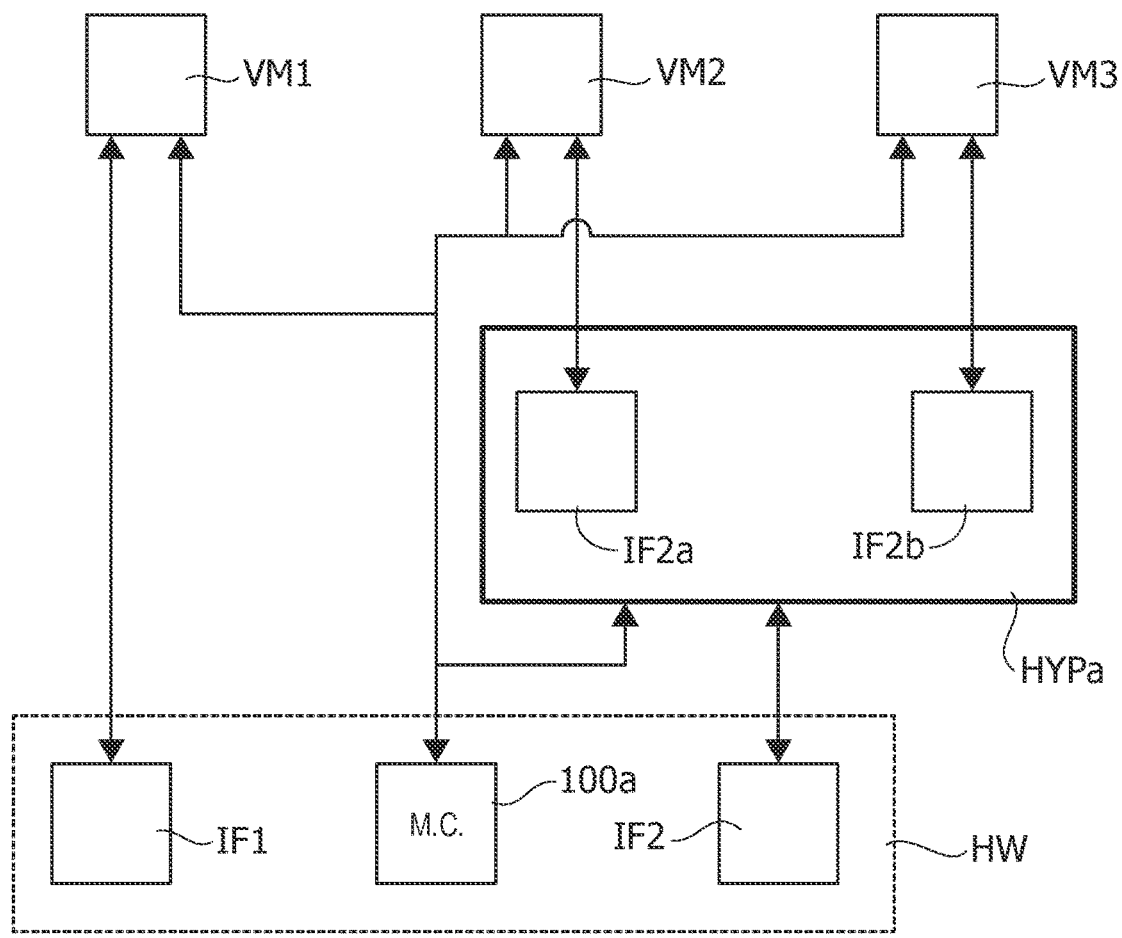
FIG. 12 shows an embodiment of the configuration of the access rights of the virtual machine of FIG. 12.
FIG. 13 shows an embodiment of the firewall configuration data for the processing system shown in FIG. 12.

For example, FIG. 12 shows an embodiment, wherein the hardware layer HW of the processing system 10a comprises two interfaces IF1 and IF2 and a memory controller 100a managing access to a memory, such as a volatile memory 104b. Specifically, in the embodiment considered, the processing system 10a executes again a hypervisor and three virtual machines VM1, VM2 and VM3, wherein:

the virtual machine VM1 should have exclusive access to the interface IF1, the hypervisor HYPa should have exclusive access to the interface IF2, but manages two virtual/software interfaces IF2a and IF2b, which are accessible by the virtual machines VM2 and VM3; and the hypervisor HYPa and each virtual machine should have access to respective memory ranges managed by the memory controller 100a.

In this respect, FIG. 13 shows a possible organization of the physical address range PA associated with the communication system 114a in case of two interfaces IF1 and IF2 and a memory controller 110a. Specifically, in the embodiment considered, the memory controller 110a is configured to manage access rights for a plurality of memory blocks, such as eight blocks MEM_01 . . . MEM_08. For example, considering a memory of 2048 Kbytes, each memory block may correspond to respective 256 Kbytes of memory. In this case, the address range may comprise:

a physical address range PA1 associated with the security configuration IF1_SEC of the slave interface circuit of the first interface IF1;

a physical address range PA2 associated with a register interface IF1_REG of the first interface IF1;

a physical address range PA3 associated with the security configuration IF2_SEC of the slave interface circuit of the second interface IF2;

a physical address range PA4 associated with a register interface IF2_REG of the second interface IF2;

a physical address range PA5 associated with the security configuration MEM_SEC of the slave interface circuit of the memory controller 100a; and physical address ranges PA6 . . . PA13 associated with the memory blocks MEM_01 . . . MEM_08 managed by the memory controller.

Generally, while not shown in FIG. 13, in various embodiments, also the address range associated with a processing core 102a comprise at least two physical address ranges: a first address range associated with the security configuration data of the slave and master interface circuits of the processing core (firewall configuration data and VMID/ASID to be included in the requests REQ sent by the processing core) and one or more address ranges for exchanging data with the microprocessor 1020.

As mentioned before, the security configuration data SECS/SECM should only be programmable by the hypervisor HYPa, e.g., the address ranges PA1, PA3 and PA5 should only be programmable via the hypervisor HYPa.

For example, in various embodiments, the processing system executing the hypervisor HYPa and n virtual machines VM1 . . . VMn, is configured to use:

a first VMID for the hypervisor HYPa, and respective VMIDs for each of then virtual machines VM1 . . . VMn.

For example, in various embodiments, the value VMID may comprise 8 bits, which permits to use 256 different VMIDs.

Accordingly, access to the security configuration data may be ensured by using for the hypervisor HYPa the VMID correspond to the reset value of the firewall configuration data 1066, e.g., zero. Generally, the firewall configuration data associated with the security configuration data, e.g., PA1, PA3 and PA5, may also be fixed and hardwired. For example, only the VMID=0 may program the various security configuration data.

Additionally or alternatively, a dedicated bit of the communications exchanged via the communication system 10*a* may indicate a request REQ sent by a hypervisor HYPa. For example, in case of an ARM Cortex-R52 or generally a communication system based on the AXI protocol, the privilege information of the AXI protocol may be used, e.g., the bits ARPROTM[0] and AWPROTM[0] of the AXI protocol.

Accordingly, in this case, the firewall managing access to given security configuration data, e.g., IF1_SEC, IF2_SEC, MEM_SEC, may permit access to these data only when the correct VMID and/or privilege information is set.

As mentioned before, the security configuration data SECM and/or SECS associated with the various slave and/or master interface circuits may also be programmed by sending requests to one or more dedicated slave interfaces. For example, in case the security configuration data, e.g., IF1_SEC, IF2_SEC, MEM_SEC, are managed within the communication system 114*a*, the firewall of a slave interface managing the address ranges associated with these security configuration data, e.g., PA1, PA3 and PA5, may permit only requests REQ sent with the VMID associated with the hypervisor HYPa and/or when the privilege information is set.

Accordingly, in this case the hypervisor HYPa may program the various security configuration data SECS (firewall configuration data 1066) in order to set the access rights to the one or more address ranges managed by the respective circuit, and in case the circuit comprises also a master interface, the security configuration data SECM (register VMID and the optional register ASID).

For example, the security configuration data IF1_SEC may be used to set the VMID(s) (and optionally ASID(s)) having access to the physical address range PA2 assigned to the register interface IF1_REG, the security configuration data IF2_SEC may be used to set the VMID(s) (and optionally ASID(s)) having access to the physical address range PA2 assigned to the register interface IF2_REG and the security configuration data MEC SEC may be used to set the VMID(s) (and optionally ASID(s)) having access to the physical address range PA6 . . . PA13 assigned to the memory blocks MEM_01 . . . MEM_08.

For example, in the embodiment shown in FIG. 13, the hypervisor HYPa configures the various slave interfaces, such that:
  the VMID associated with the virtual machine VM1 may access the physical address range PA2 associated with the register interface IF1_REG of the first interface IF1;
  the VMID associated with the hypervisor HYPa may access the physical address range PA4 associated with the register interface IF2_REG of the second interface IF2;
  the VMID associated with the hypervisor HYPa may access the physical address range PA6 and PA7 associated with the memory blocks MEM_01 and MEM_02; and
  each VMID associated with the virtual machines VM1, VM2 and VM3 may access the physical address ranges As mentioned before, in case a circuit comprises also a master interface circuit, the security configuration data include also the data SECM (at least the content of the register VMID). For example, also the master interface 1062*a* of a resource 106*a* transmits with each read or write request the content of the register VMID (and optionally the register ASID) of the resource 106*a*. In this configuration, separation of the various resources 106*a* may be obtained by assigning further VMIDs to each resource 106*a* and programming the respective access rights to the firewall configuration data 1066 of the slave interfaces. However, the inventors have observed that each resource 106*a* is either a dedicated resource, associated with a specific virtual machine VM, or a shared resource and thus assigned to the hypervisor HYPa. According it may be rather useless to manage further VMIDs, but it is sufficient to store to the register VMID of a given circuit the VMID of the virtual machine VM (or the hypervisor HYPa) to which the circuit is assigned. In fact, the configuration of the firewalls of the slave interfaces implies that a given slave interface treats the requests containing the same VMID in the same manner.

As mentioned before, also the other bus masters may also support the register ASID. For example, this may be useful, when a virtual machine uses the field ASID in order to identify requests sent by the operating system OS (e.g., identified via a first ASID) and requests sent by the applications APP (e.g., identified via one or more further ASIDs). For example, as described with respect to FIG. 13, the slave interface circuit of the memory controller 100*a* may permit the configuration of access rights for each of a plurality of address ranges, e.g., address ranges PA6 . . . PA13.

In this case, the hypervisor HYPa could program the firewall configuration data 1066 in order to indicate whether a given ASID may also access the assigned memory range or not. For example, with respect to FIG. 13, the firewall configuration data (included in the security configuration data MEM_SEC) may indicate that the operating system OS of a given virtual machine may access both memory blocks assigned to the respective VMID, while the applications (identified via a given ASID) may only access the second memory block assigned to the respective VMID.

Accordingly, in the embodiments described herewith, the address range protection is implemented directly in the target slave interface circuit, e.g.:
  access to the physical address ranges PA1 and PA2 are managed by the firewall of the slave interface circuit of the interface IF1;
  access to the physical address ranges PA3 and PA4 are managed by the firewall of the slave interface circuit of the interface IF2;
  access to the physical address ranges PA5 . . . PA13 are managed by the firewall of the slave interface circuit of the memory controller 100*a*.

Accordingly, the firewall of each slave interface circuit has to verify only the access rights for the physical addresses managed by the respective slave interface circuit. However, this also implies that the various software tasks have to know a-priori the physical memory ranges assigned to the respective software task (via the VMID and optionally the ASID). For example, as already explained in the foregoing, the processing cores 102*a* send directly requests containing a physical address PA. Accordingly, the software executed by a given virtual machine has to know the physical address ranges assigned to virtual machine because no address translation is performed. For example, for this reason, the software executed by the virtual machine VM1 has to know a-priori that it may only access the physical memory ranges PA2, PA8 and PA9. For example, this specification has to be provided to the software development team assigned to develop the software of the first virtual machine VM1. In fact, as mentioned before, such virtual memory mapping functions may be incompatible with real time control systems. However, in any case, e.g., for virtual machines not executing real time control functions, the operating system OS of a given virtual machine could still manage virtual address translation tables for the application layer.

Moreover, as described with respect to FIG. 13, the protection may be implemented by dividing the managed address range into one or more sub-sets of address sub-ranges, and providing for each sub-set a configuration register (or two in case read and write requests are treated differently) for storing the VMID(s) (and optionally the ASID(s)), which may access the respective sub-range. For example, in various embodiments, each firewall may be configured to manage 4, 8, 16 or 32 address ranges.

Thus, in various embodiments, the verification operation within the firewall may be implemented with a fast and low-complexity combinational logic circuit, which only has to determine the address sub-range of the request (based on the physical address included in the request), and compare the VMID (and optionally ASID) included in the request with the VMID(s) (and optionally ASID(s)) stored in the firewall configuration register associated with the address sub-range. Thus, this operation does not introduce significant latencies and is thus suitable for real-time control systems.

In various embodiments, a master interface circuit and/or a slave interface circuit may also manage a plurality of circuits.

Figure 14:
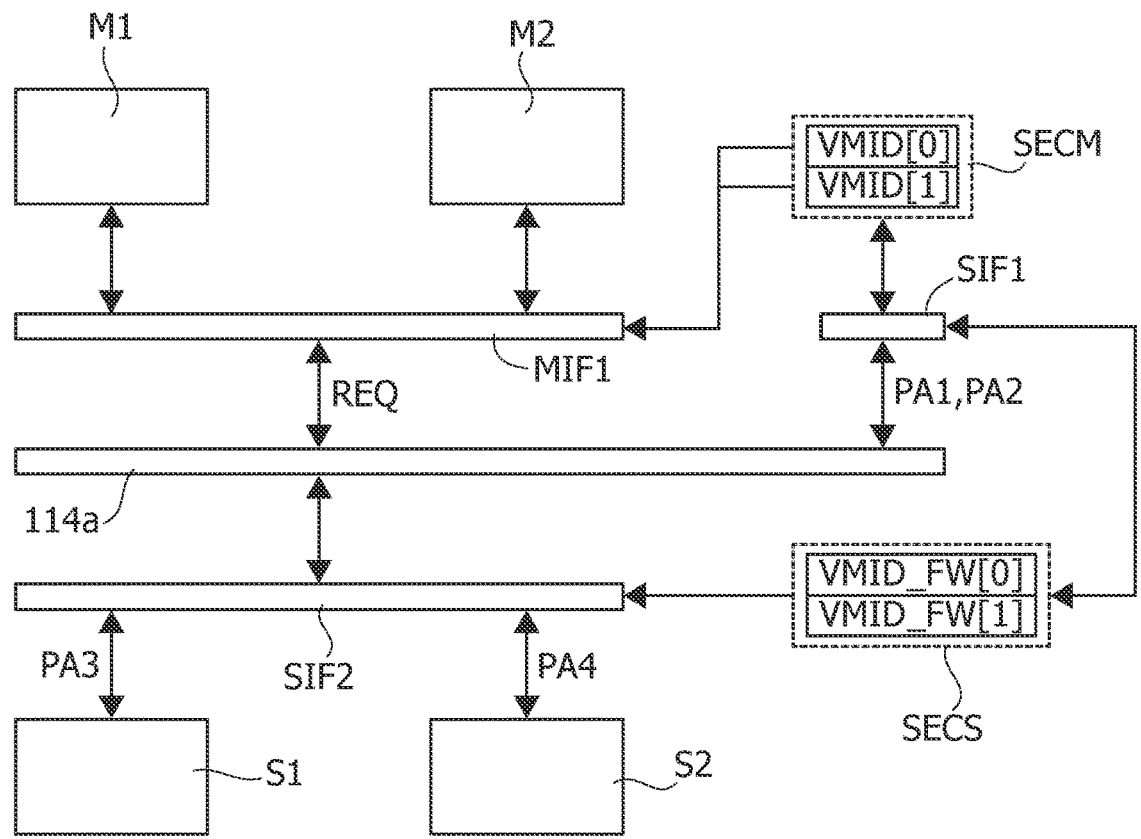
FIG. 14 shows an embodiment of a generic master interface and slave interface.

For example, FIG. 14 shows and embodiment, wherein a master interface circuit MIF1 manages at least two master circuits M1 and M2. As mentioned before, a master interface circuit may initiate a communication on the communication system 114a.

Accordingly, the master interface MIF1 uses the communication protocol of the communication system 114a for communication with the communication system 114a, but the master interface circuit MIF1 may use different protocols for communicating with the master circuits M1 and M2. For example, the communication system 114a may be a NoC and:
    the master circuits M1 and M2 may be connected to the master interface circuit MIF1 via a bus; or
    the master circuits M1 and M2 may be connected to the master interface circuit MIF1 via respective independent communication channels.

Figure 15:
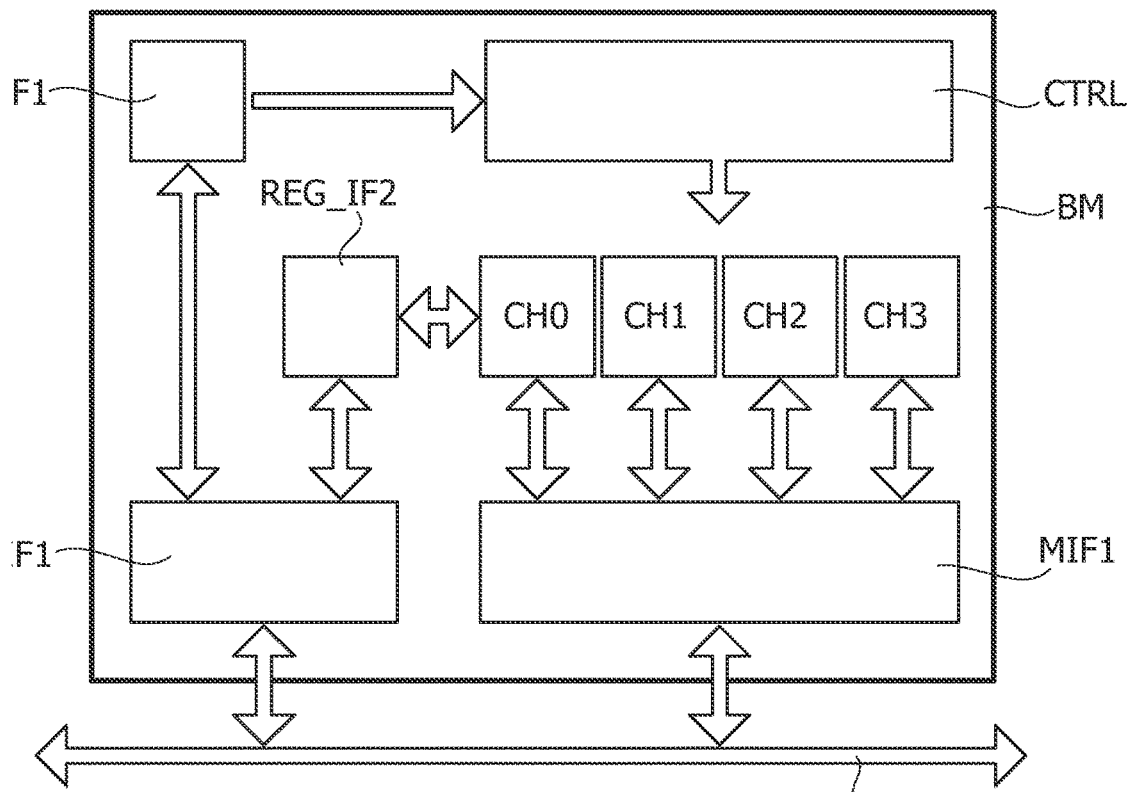
FIG. 15 shows an embodiment of a bus master comprising a plurality of functional channels.

For example, FIG. 15 shows an embodiment of a generic bus master BM wherein the master interface circuit MIF1 comprises a plurality of functional channels, such as channels CH0 . . . CH3.

In this case, the bus master BM may comprise a slave interface circuit SIF1, which manages access to a register interface REG_IF2 configured to store the channel configuration information. For example, the channel configuration information may indicate whether a given channel may initiate a communication or not, select which circuit should be connected to a given channel, specify a given target physical address, etc.

In various embodiments, the bus master BM may also comprise a control circuit CTRL. In this case, the slave interface circuit SIF1 may also manage access to a register interface REG_IF1 configured to store the control configuration information.

For example, the control circuit CTRL may be a state machine, which may be configured to automatically increase the target physical address associated with a given channel after each transmission of data for the specific channel.

Thus, in the embodiment considered, the bus master BM may correspond to a DMA controller 110a.

Figure 16:
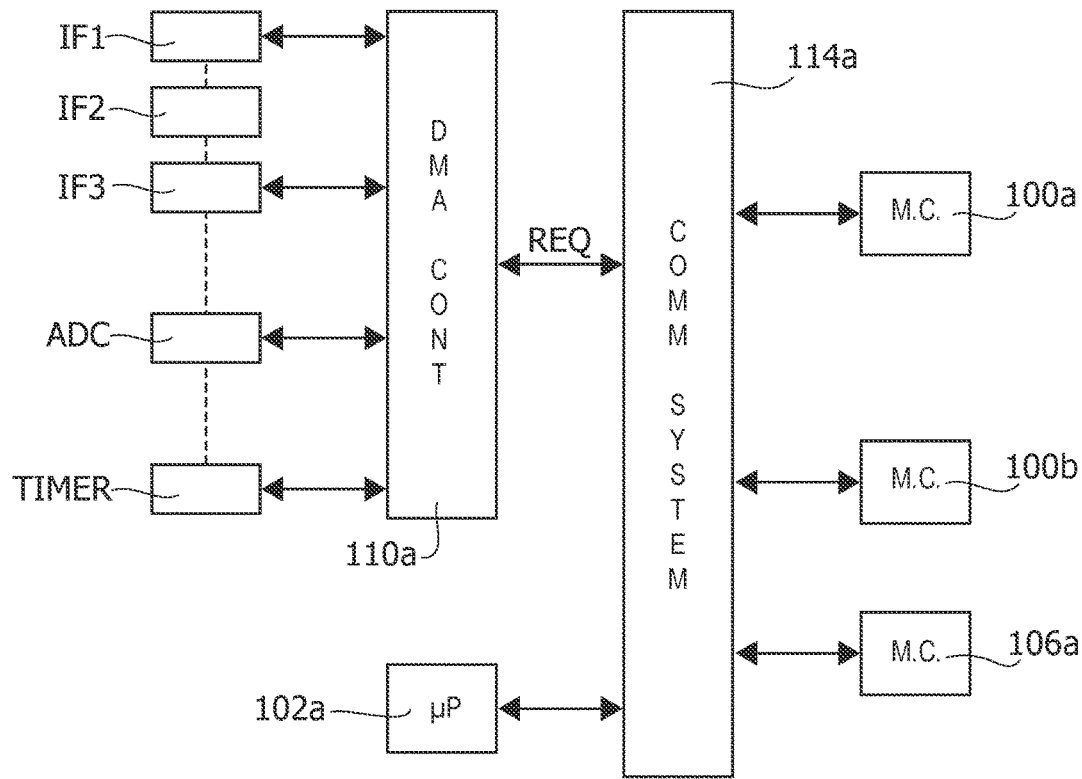
FIG. 16 shows an embodiment of a bus master, in particular a DMA controller.

For example, as shown in FIG. 16, such a DMA controller 110a may be used to receive data from one or more circuits, such as resources or peripherals 106a, such as three interfaces IF1, IF2, IF3, an analog-to-digital converter ADC and a timer circuit TIMER, and generate requests REQ containing the data received and a physical address associated with a slave interface circuit connected to the communication system 114a, such as a first memory controller 100a (e.g., managing access to a non-volatile memory 104), a second memory controller 100b (e.g., managing access to a volatile memory 104b), a processing core 102a and/or a resource 106a.

As described in the foregoing, in various embodiments, the master interface circuit MF1 is configured to transmit with each request REQ also the ID associated with the master circuit handled by the master interface circuit MF1.

For example, in the embodiment shown in FIG. 14, the master interface MIF1 manages two master circuits M1 and M2. Accordingly, in the embodiment considered, the master interface circuit MIF1 has associated two registers VMID[0] and VMID[2] for storing the IDs to be included into the requests REQ sent by the master interface circuit MIF1 to the communication system 114a based on requests received from the master circuit M1 or M2, respectively.

Figure 17:
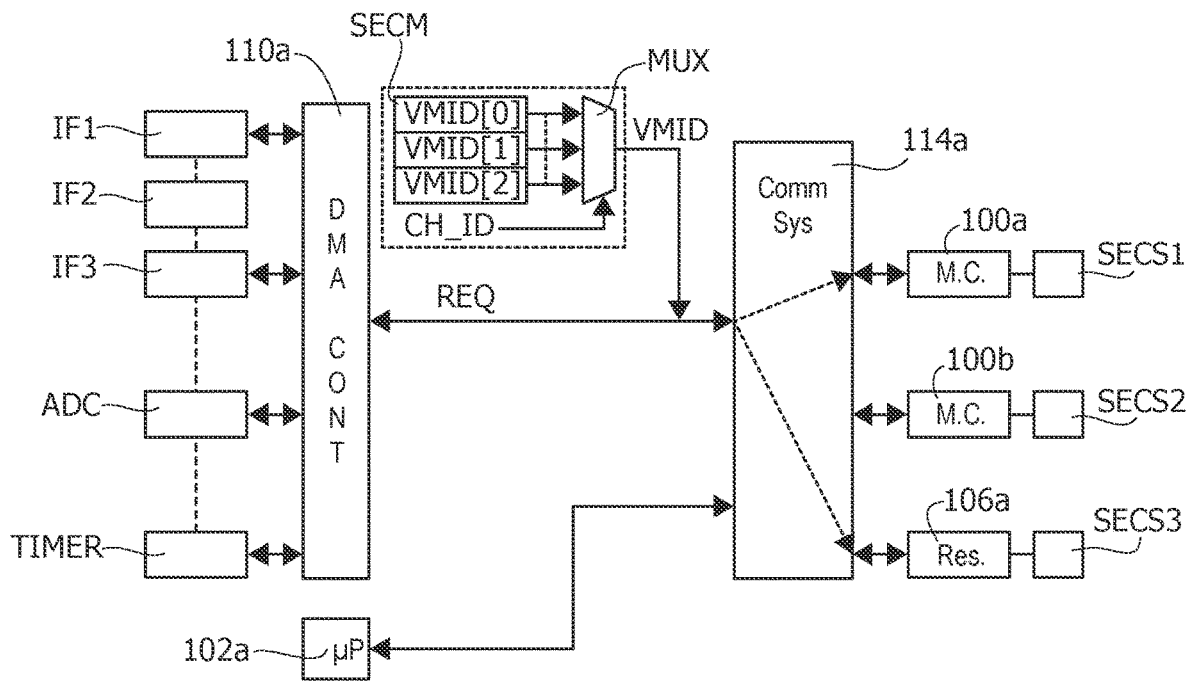
FIG. 17 shows an embodiment of the security configuration for the processing system of FIG. 16.

Similarly, FIG. 17 shows an embodiment, wherein the master interface circuit of the DMA controller 110a shown in FIG. 16 has now associate for each functional channel a respective register for storing the VMID associated with the channel, e.g., VMID[0], VMID[1], VMID[2], etc. For example, in FIG. 17, the VMID to be included in the request REQ to be sent to the communication system 114a is selected via a multiplexer MUX as a function of a signal CH_ID indicating the number of the channel for which the DMA controller 110a wants to transmit the request REQ.

As mentioned before, the registers containing the virtual machine IDs form part of the security configurations SECM of the master interface circuit MIF1. Specifically, in various embodiments, these security configurations SECM may only be programmed via the hypervisor HYPa. For example, as described in the foregoing, a hypervisor HYPa executed by a processing core 102a may send a corresponding write request to a slave interface SIF1, which may be associated with the bus master or may be a dedicated slave interface. Generally, in case the slave interface circuit SIF1 is associated with the bus master, the slave interface circuit SF1 may also be used to manage other functions of the bus master (see, e.g., FIG. 15) and/or the master circuits M1 and M2 managed by the master interface MIF1 (see FIG. 14).

Accordingly, in the embodiments considered, the master interface MIF1 is configured to insert into the requests REQ (apart from data identifying the request):
    a physical target address PA associated with a target slave interface circuit; and
    a single VMID, which identifies the master circuit being the source of the request.

As described in the foregoing, the master interface MIF1 could also insert into the requests an ASID.

Accordingly, a slave interface SIF2 associated with the physical target address may, receive the request REQ, extract the VMID and compare the VMID with the firewall configuration data stored to the security configuration data SECS of the slave interface SIF2.

For example, in FIG. 14, the slave interface SIF2 manages two slave devices S1 and S2. Accordingly, in this case, the slave interface SIF2 may use (at least):

a first physical address range PA3 associated with the slave device S1;

a second physical address range PA4 associated with the slave device S2.

As described in the foregoing, the security configuration data SECM and/or SECS may be managed via a slave interface circuit of the respective circuit and/or a dedicated slave interface circuit. For example, FIG. 14 shows an embodiment, wherein one or more slave interface SIF1 manage the security configuration data SECM and/or SECS. Accordingly, in this case, the slave interface SIF1 may use (at least):

a first physical address range PA1 associated with the security configuration data SECM of the master interface circuit MIF1; and/or a second physical address range PA2 associated with the security configuration data SECS of the slave interface SIF2.

Accordingly, in the embodiment considered, a hypervisor HYPa executed by a processing core 102a may send a write request to the address range PA2 (e.g., managed by the slave interface SIF1) for programming the security configuration data SECS, in particular the firewall configuration data. Specifically, in the embodiment considered, the firewall configuration data comprise (at least):

a register VMID_FW[0] for storing at least one VMID for the second physical address range PA3 associated with the slave device S1; and a register VMID_FW[1] for storing at least one VMID for the second physical address range PA3 associated with the slave device S1

Accordingly, when the slave interface SIF2 receives a request REQ, the slave interface SIF2 may determine the respective address range and compare the VMID included in the request REQ with the at least one VMID stored in the security configuration data SECS associated with the address range comprising the physical address included in the request REQ.

For example, in the embodiment shown in FIG. 14, the hypervisor HYPa may send a write requests to the address ranges PA1 and PA2 (e.g., managed by the slave interface SIF1) in order to store:

a first VMID in the register VMID[0] of the security configuration data SECM and in the register VMID_FW[0] of the security configuration data SECS; and a second VMID in the register VMID_FW[1] of the security configuration data SECM and in the register VMID[1] of the security configuration data SECS.

Accordingly, in this case, the master circuit M1 may exchange data with the slave device S1 (but not with the slave device S2) and the master circuit M2 may exchange data with the slave device S2 (but not with the slave device S1).

Similarly, also the various slave interface circuits shown in FIG. 17 may have associated registers for storing the respective security configuration data, in particular the firewall configuration data, which indicate the VMIDs of the master devices being allowed to send requests to the slave device. For example, the memory controllers 100a and 100b may have associated security configuration data SECS1 and SECS2, which respectively permit to store, for each of a plurality of memory blocks, one or more permitted VMIDs. Similarly, any other resource 106a may have associated security configuration data SEC3 for specifying the respective access rights. Again, the respective security configuration data SECS to be used by a given slave interface circuit may be programmable via the same slave interface circuit or via one or more dedicated slave interfaces.

Accordingly, in various embodiments, the hypervisor may assign given circuits to a specific virtual machine VM identified by a given VMID by:

in case of a master circuit, storing the VMID of the virtual machine VM to the registers VMID of the security configuration data SECM, which is associated with the functional channel of the respective master interface MF1 handling the communication between the master circuit and the communication system 114a; and in case of a slave circuit, storing the VMID of the virtual machine VM to the registers VMID_FW of the security configuration data SECS, which are associated with the physical address ranges the virtual machine may access.

For example, as described, e.g., in Italian patent application n. 102020000006322 in the context of a SPI interface, an interface itself may also manage a plurality of separate (queued) physical channels, which exchange data via a single hardware interface. Moreover, document 102020000006322 discloses a data exchange between the processing core 102 and the interface 106 via DMA communication. For this purpose, the various physical channels are configured via global configuration registers and for each channel respective local configuration registers. For example, with respect to the arrangement shown in FIGS. 12 and 13, the hypervisor HYPa may be configured to send requests in order to configure the security configuration data SECS in order to implement the following access rights:

the VMID of the hypervisor HYP may access:
  the address range associated with the global configuration registers of the interface,
  the address range associated with the local configuration registers of a queued interface IF2, and
  the address range associated with the memory blocks MEM_01 and MEM_02; and the VMID of the virtual machine VM1 may access:
  the address range associated with the local configuration registers of a queued interface IF1, and
  the address range associated with the memory blocks MEM_03 and MEM_04.

Moreover, the hypervisor HYPa may be configured to send requests in order to:

enable DMA transfer for the queued interface IF1 and the queued interface IF2, specify the target address ranges for the DMA transfer for the queued interface IF1 and queued interface IF2, wherein the target address range of the queued interface IF1 belongs to the address range of the memory blocks MEM_03 and MEM_04 and the target address range of the queued interface IF2 belongs to the address range of the memory blocks MEM_01 and MEM_02, and set the security configuration data SECM associated with the DMA controller 110a, wherein the channels assigned to the interface IF1 use the VMID of the virtual machine VM1 and the channels assigned to the interface IF2 use the VMID of the hypervisor HYPa.

Accordingly, the present disclosure provides a low-complexity and extremely fast solution for implementing the separation between different virtual machines, which is particularly important in the context of multi-core real-time control systems.

Of course, without prejudice to the principle of the disclosure, the details of construction and the embodiments may vary widely with respect to what has been described and illustrated herein purely by way of example, without thereby departing from the scope of the present disclosure.

A processing system (10a) may be summarized as including a communication system (114a) having a given physical address range (PA); a plurality of processing cores (102a), each processing core comprising a microprocessor (1020a) configured to execute software instructions and having associated a first master interface circuit (1022a) configured to forward read or write requests (REQ) from said microprocessor (1020a) to said communication system (114a), said read or write requests (REQ) comprising a physical address of said physical address range; a first circuit (S1) having associated a slave interface circuit (SIF2) configured to selectively forward read or write requests (REQ) addressed to a given address sub-range (PA3) from said communication system (114a) to said first circuit (S1); and a second circuit (M1) having associated a second master interface circuit (MIF1) configured to forward read or write requests (REQ) from said second circuit (M1) to said communication system (114a); wherein said first master interface circuit (1022a) has associated a first register (SECM) for storing a first virtual machine ID (VMID) and is configured to read said first virtual machine ID (VMID) from said first register (SECM) and insert said first virtual machine ID (VMID) into said read or write requests (REQ) forwarded from said microprocessor (1020a) to said communication system (114a); wherein said second master interface circuit (MIF1) has associated a second register (SECM) for storing a second virtual machine ID (VMID[0]) and is configured to read said second virtual machine ID (VMID[0]) from said second register (SECM) and insert said second virtual machine ID (VMID[0]) into said read or write requests (REQ) forwarded from said second circuit (M1) to said communication system (114a); wherein said slave interface circuit (SIF2) has associated a third register (SECS) for storing a third virtual machine ID (VMID_FW[0]) associated with said given first address sub-range (PA3) and is configured to receive a read or write request (REQ) addressed to said given address sub-range (PA3) from said communication system (114a), extract from said received request (REQ) a virtual machine ID, read said third virtual machine ID (VMID_FW[0]) from said third register (SECS), determine whether said virtual machine ID extracted from said received request (REQ) corresponds to said third virtual machine ID (VMID_FW[0]), in response to determining that said virtual machine ID extracted from said received request (REQ) corresponds to said third virtual machine ID (VMID_FW[0]), forward said read or write request (REQ) to said first circuit (S1), and in response to determining that said virtual machine ID extracted from said received request (REQ) does not corresponds to said third virtual machine ID (VMID_FW[0]), inhibit forwarding said read or write request (REQ) to said first circuit (S1); and wherein said first register (SECM), said second register (SECM) and said third register (SECS) are programmable via software instructions executed by said microprocessor (1020a).

Said third register (SECS) may be configured to store a read virtual machine ID and a write virtual machine ID, and wherein said determining whether said virtual machine ID extracted from said received request (REQ) corresponds to said third virtual machine ID (VMID_FW[0]) may include determining whether the received request (REQ) may be a read request or a write request; in response to determining that the received request (REQ) may be a read request, determining whether said virtual machine ID extracted from said received request (REQ) corresponds to said read virtual machine ID, and in response to determining that the received request (REQ) may be a write request, determining whether said virtual machine ID extracted from said received request (REQ) corresponds to said write virtual machine ID.

Said processing system (10a) may be configured to execute on said plurality of processing cores (102a) a hypervisor (HYPa) and one or more virtual machines (VM), wherein with each virtual machine (VM) may be associated a respective virtual machine ID, and wherein said processing system (10a) may be configured such that said first register (SECM), said second register (SECM) and said third register (SECS) may be programmable via said hypervisor (HYPa) and not programmable via said one or more virtual machines (VM).

Said hypervisor (HYPa) may be configured for storing a first virtual machine ID value to the first register (SECM) associated with the first master interface circuit (1022a) of a first processing core (102a1), storing a second virtual machine ID value to the first register (SECM) associated with the first master interface circuit (1022a) of a second processing core (102a2), storing the first virtual machine ID value to said second register (SECM) and said third register (SECS), starting a first virtual machine (VM1) on said first processing core (102a1), and starting a second virtual machine (VM2) on said second processing core (102a1), whereby said slave interface circuit (SIF2) is configured to forward read and/or write requests (REQ) received from the first virtual machine (VM1) and said second circuit (M1) to said first circuit (S1); and inhibit the forwarding of read and/or write requests (REQ) received from the second virtual machine (VM2).

When a processing core (102a) is executing said hypervisor (HYPa), the respective first master interface circuit (1022a) may be configured to insert into said read or write requests (REQ) forwarded from the respective microprocessor (1020a) to said communication system (114a) a given virtual machine ID (VMID) associated with said hypervisor (HYPa) and/or one or more bits indicating a privilege information.

Said microprocessor (1020a) may have associated a first slave interface circuit (1024a) configured to forward read or write requests (REQ) addressed to a given first address sub-range (PA_102) from said communication system (114a) to said first register (SECM); and/or wherein said second circuit (M1) may have associated a second slave interface circuit (SIF1) configured to forward read or write requests (REQ) addressed to a given second address sub-range (PA1) from said communication system (114a) to said second register (SECM).

Said processing system may include a further slave interface (SIF1) configured to forward read or write requests (REQ) addressed to a given third address sub-range (PA2) from said communication system (114a) to said third register (SECS); or said slave interface circuit (SIF2) may be configured to forward read or write requests (REQ) addressed to a given further address sub-range from said communication system (114a) to said third register (SECS).

At least one of said slave interface circuit (SIF2), said further slave interface (SIF1), said first slave interface circuit (1024a) and said second slave interface circuit (SIF1) may be configured to receive a read or write request (REQ) addressed to a respective address sub-range; extract from said received request (REQ) a virtual machine ID and/or a privilege information; and in response to determining that said virtual machine ID extracted from said received request (REQ) corresponds to a determined virtual machine ID and/or said privilege information may have a given value, forward said read or write request (REQ) to the respective register. The determined virtual machine ID may be predetermined.

Said first register (SECM) may be configured to store a first Address Space ID (ASID) and said first master interface circuit (1022a) may be configured to insert said first Address Space ID (ASID) into said read or write requests (REQ) forwarded from said microprocessor (1020a) to said communication system (114a); wherein optionally said second register (SECM) may be configured to store a second Address Space ID (ASID) and said second master interface circuit (MIF1) may be configured to insert said second Address Space ID (ASID) into said read or write requests (REQ) forwarded from said second circuit (M1) to said communication system (114a); and wherein said third register (SECS) may be configured to store a third Address Space ID (ASID) and said slave interface circuit (SIF2) may also be configured to extract from said received request (REQ) an Address Space ID, read said third Address Space ID (ASID) from said third register (SECS), determine whether said Address Space ID extracted from said received request (REQ) corresponds to said third Address Space ID (ASID), and forward said read or write request (REQ) to said first circuit (S1) only when also the said Address Space ID extracted from said received request (REQ) corresponds to said third Address Space ID (ASID).

The processing system may include a third circuit (M2), wherein said second register (SECM) may be configured to store a fourth virtual machine ID (VMID[1]), wherein said second master interface circuit (MIF1) may be configured to forward read or write requests (REQ) from said third circuit (M2) to said communication system (114a), and wherein said second master interface circuit (MIF1) may be configured to read said fourth virtual machine ID (VMID[1]) from said second register (SECM) and insert said fourth virtual machine ID (VMID[1]) into said read or write requests (REQ) forwarded from said third circuit (M2) to said communication system (114a).

Said second circuit (M1), said third circuit (M2) and said second master interface circuit (MIF1) may implement a DMA controller (110a), wherein said second circuit (M1) corresponds to a read channel (CH1) sending read requests and said third circuit (M2) corresponds to a write channel (CH2) sending write requests.

An integrated circuit may be summarized as including a processing system (10a).

A device, such as a vehicle, may be summarized as including a plurality of processing systems (10a), wherein said processing system (10a) are connected via a further communication system (20).

A method of operating a processing system (10a) may be summarized as including starting a hypervisor (HYPa) on at least one of the processing cores (102a).

Said hypervisor (HYPa) may be configured for storing a first virtual machine ID value to the first register (SECM) associated with the first master interface circuit (1022a) of a first processing core (102a1), storing a second virtual machine ID value to the first register (SECM) associated with the first master interface circuit (1022a) of a second processing core (102a2), storing the first virtual machine ID value to said second register (SECM) and said third register (SECS), starting a first virtual machine (VM1) on said first processing core (102a1), and starting a second virtual machine (VM2) on said second processing core (102a1).

In an embodiment, a processing system comprises a communication system having a physical address range. A plurality of processing cores are coupled to the communication system. Each processing core comprises: a microprocessor, which, in operation, executes software instructions; and a first master interface circuit associated with the processing core, wherein the first master interface circuit, in operation, forwards read or write requests from said microprocessor to said communication system, said read or write requests including a physical address of said physical address range. The processing system includes a first circuit; a first slave interface circuit associated with the first circuit, wherein the first slave interface circuit, in operation, selectively forwards read or write requests addressed to an address sub-range of the physical address range from said communication system to said first circuit; a second circuit; a second master interface circuit associated with the second circuit, wherein the second master interface circuit, in operation, forwards read or write requests from said second circuit to said communication system; a first register, associated with the first master interface circuit, wherein the first register, in operation, stores a first virtual machine ID; a second register, associated with the second master interface circuit, wherein the second register, in operation, stores a second virtual machine ID; and a third register, associated with the first slave interface circuit, wherein the third register, in operation, stores a third virtual machine ID. Said first register, said second register and said third register are programmable via software instructions executed by said microprocessor. The first master interface circuit, in operation, reads said first virtual machine ID from said first register and inserts said first virtual machine ID into said read or write requests forwarded from said microprocessor to said communication system. The second master interface circuit, in operation, reads said second virtual machine ID from said second register and inserts said second virtual machine ID into said read or write requests forwarded from said second circuit to said communication system. The first slave interface circuit, in operation, responds to a read or write request received from the communication system and addressed to an address of the address sub-range of the physical address range by: extracting a virtual machine ID from said received request; reading said third virtual machine ID from said third register; determining whether said virtual machine ID extracted from said received request corresponds to said third virtual machine ID; in response to determining that said virtual machine ID extracted from said received request corresponds to said third virtual machine ID, forwarding said read or write request to said first circuit; and in response to determining that said virtual machine ID extracted from said received request does not correspond to said third virtual machine ID, inhibiting forwarding of said read or write request to said first circuit.

In an embodiment, said third register, in operation, stores a read virtual machine ID and a write virtual machine ID; and said determining whether said virtual machine ID extracted from said received request corresponds to said third virtual machine ID comprises: determining whether the received request is a read request or a write request; in response to determining that the received request is a read request, determining whether said virtual machine ID extracted from said received request corresponds to said read virtual machine ID; and in response to determining that the received request is a write request, determining whether said virtual machine ID extracted from said received request corresponds to said write virtual machine ID. In an embodiment, said plurality of processing cores, in operation, execute a hypervisor and one or more virtual machines, wherein with each virtual machine is associated a respective virtual machine ID; said first register, said second register and said third register are programmable via said hypervisor; said first register, said second register, and said third register are not programmable via said one or more virtual machines. In an embodiment, the system comprises a plurality of first registers, each associated with a respective first master interface circuit, wherein said hypervisor, in operation, stores a first virtual machine ID value to a first register of the plurality of first registers associated with the first master interface circuit of a first processing core; stores a second virtual machine ID value to another first register associated with the first master interface circuit of a second processing core; stores the first virtual machine ID value to said second register and said third register; starts a first virtual machine on said first processing core; and starts a second virtual machine on said second processing core, wherein said first slave interface circuit, in operation: responds to read or write requests received via the communication system from the first virtual machine or the second circuit and addressed to an address of the address sub-range by forwarding the read or write requests to said first circuit; and inhibits the forwarding of read or write requests received from the second virtual machine to the first circuit via the communication system.

In an embodiment, when a processing core is executing said hypervisor, the respective first master interface circuit associated with the processing core, in operation, inserts into said read or write requests forwarded from the respective microprocessor of the processing core executing the hypervisor to said communication system a virtual machine ID associated with said hypervisor. In an embodiment, when a processing core is executing said hypervisor, the respective first master interface circuit associated with the processing core, in operation, inserts into said read or write requests forwarded from the respective microprocessor of the processing core executing the hypervisor to said communication system one or more bits indicating privilege information. In an embodiment, when a processing core is executing said hypervisor, the respective first master interface circuit associated with the processing core, in operation, inserts into said read or write requests forwarded from the respective microprocessor of the processing core executing the hypervisor to said communication system a virtual machine ID associated with said hypervisor and one or more bits indicating privilege information.

In an embodiment, said microprocessor has associated a second slave interface circuit, which in operation, forwards read or write requests addressed to a first address sub-range from said communication system to said first register; said second circuit has associated a third slave interface circuit configured to forward read or write requests addressed to a second address sub-range from said communication system to said second register; or said microprocessor has associated a second slave interface circuit, which in operation, forwards read or write requests addressed to a first address sub-range from said communication system to said first register and said second circuit has associated a third slave interface circuit configured to forward read or write requests addressed to a second address sub-range from said communication system to said second register. In an embodiment, the processing system comprises a fourth slave interface circuit, which, in operation, forwards read or write requests addressed to a third address sub-range from said communication system to said third register; or said first slave interface circuit is configured to forward read or write requests addressed to the third address sub-range from said communication system to said third register. In an embodiment, at least one of said first slave interface circuit, said second slave interface circuit, said third slave interface circuit and said fourth slave interface circuit, in operation: receives a read or write request addressed to a respective address sub-range; extracts from said received request a virtual machine ID, privilege information, or both a virtual machine ID and privilege information; and in response to determining that said virtual machine ID extracted from said received request corresponds to a determined virtual machine ID or said privilege information has a determined value, forwards said read or write request to the respective register.

In an embodiment, said first register, in operation, stores a first Address Space ID and said first master interface circuit, in operation, inserts said first Address Space ID into said read or write requests forwarded from said microprocessor to said communication system; said second register, in operation, stores a second Address Space ID and said second master interface circuit, in operation, inserts said second Address Space ID into said read or write requests forwarded from said second circuit to said communication system; and said third register, in operation, stores a third Address Space ID and said slave interface circuit, in operation: extracts from said received request an Address Space ID, reads said third Address Space ID from said third register, determines whether said Address Space ID extracted from said received request corresponds to said third Address Space ID, and forwards said read or write request to said first circuit in response to determining said Address Space ID extracted from said received request corresponds to said third Address Space ID.

In an embodiment, the system comprises a third circuit, wherein said second register, in operation, stores a fourth virtual machine ID, wherein said second master interface circuit, in operation, forwards read or write requests from said third circuit to said communication system, and wherein said second master interface circuit, in operation, reads said fourth virtual machine ID from said second register and inserts said fourth virtual machine ID into said read or write requests forwarded from said third circuit to said communication system. In an embodiment, said second circuit, said third circuit and said second master interface circuit implement a DMA controller, wherein said second circuit corresponds to a read channel sending read requests and said third circuit corresponds to a write channel sending write requests.

In an embodiment, the system comprises an integrated circuit including: the communication system; the plurality of processing cores; the first circuit; the first slave interface circuit; the second circuit; the second master interface circuit; the first register; the second register; and the third register.

In an embodiment, a device comprises: a plurality of processing systems; and a communication bus, which, in operation, couples the plurality of processing systems together, each processing system of the plurality of processing systems includes: a communication system having a physical address range; a plurality of processing cores coupled to the communication system, each processing core comprising: a microprocessor, which, in operation, executes software instructions; and a first master interface circuit associated with the processing core, wherein the first master interface circuit, in operation, forwards read or write requests from said microprocessor to said communication system, said read or write requests including a physical address of said physical address range; a first circuit; a first slave interface circuit associated with the first circuit, wherein the first slave interface circuit, in operation, selectively forwards read or write requests addressed to an address sub-range of the physical address range from said communication system to said first circuit; a second circuit; a second master interface circuit associated with the second circuit, wherein the second master interface circuit, in operation, forwards read or write requests from said second circuit to said communication system; a first register, associated with the first master interface circuit, wherein the first register, in operation, stores a first virtual machine ID; a second register, associated with the second master interface circuit, wherein the second register, in operation, stores a second virtual machine ID; and a third register, associated with the first slave interface circuit, wherein the third register, in operation, stores a third virtual machine ID, wherein said first register, said second register and said third register are programmable via software instructions executed by said microprocessor; said first master interface circuit, in operation, reads said first virtual machine ID from said first register and inserts said first virtual machine ID into said read or write requests forwarded from said microprocessor to said communication system; said second master interface circuit, in operation, reads said second virtual machine ID from said second register and inserts said second virtual machine ID into said read or write requests forwarded from said second circuit to said communication system; and said first slave interface circuit, in operation, responds to a read or write request received from the communication system and addressed to an address of the address sub-range of the physical address range by: extracting a virtual machine ID from said received request; reading said third virtual machine ID from said third register; determining whether said virtual machine ID extracted from said received request corresponds to said third virtual machine ID; in response to determining that said virtual machine ID extracted from said received request corresponds to said third virtual machine ID, forwarding said read or write request to said first circuit; and in response to determining that said virtual machine ID extracted from said received request does not correspond to said third virtual machine ID, inhibiting forwarding of said read or write request to said first circuit.

In an embodiment, the device comprises a plurality of integrated circuits each including one or more processing systems of the plurality of processing systems, wherein the communication bus, in operation, couples the plurality of integrated circuits together. In an embodiment, the device is a vehicle having an engine and the plurality of processing systems, in operation, generate control signals to control the engine.

In an embodiment, a method comprises controlling communication over a communication system having a physical address range and coupling a processing core, a first circuit and a second circuit together. The controlling includes: starting a hypervisor on a microprocessor of the processing core; storing, under control of the hypervisor, a first virtual machine ID value to a first register associated with a first master interface circuit associated with the microprocessor; storing, under control of the hypervisor, a second virtual machine ID value to a second register associated with a second master interface circuit associated with the second circuit; storing, under control of the hypervisor executing on the first processing core, a third virtual machine ID value to a third register; inserting, by the first master interface circuit, the stored first virtual machine ID into read or write requests forwarded from the first processing core to the communication system; inserting, by the second master interface circuit, the stored second virtual machine ID into read or write requests forwarded from the second circuit to the communication system; and selectively forwarding, under control of a slave interface circuit associated with the first circuit, a read or write request addressed to an address sub-range of the physical address range from the communication system to the first circuit. The selectively forwarding includes: extracting a virtual machine ID from the request addressed to the address sub-range; reading the third virtual machine ID from the third register; determining whether the virtual machine ID extracted from the request corresponds to said third virtual machine ID; in response to determining that said virtual machine ID extracted from the request corresponds to said third virtual machine ID, forwarding the request to said first circuit; and in response to determining that said virtual machine ID extracted from said request does not correspond to said third virtual machine ID, inhibiting forwarding of said request to said first circuit.

In an embodiment, the method comprises: starting a first virtual machine on a second processing core coupled to the communication system; and storing, under control of the hypervisor, a fourth virtual machine ID value to a fourth register associated with a first master interface circuit of the second processing core. In an embodiment, the first virtual machine ID and the third virtual machine ID are a same virtual machine ID associated with the hypervisor. In an embodiment, the method comprises: storing a read virtual machine ID and a write virtual machine ID into the third register, wherein the determining whether said virtual machine ID extracted from the request corresponds to the third virtual machine ID comprises: determining whether the received request is a read request or a write request; in response to determining that the received request is a read request, determining whether said virtual machine ID extracted from said received request corresponds to said read virtual machine ID; and in response to determining that the received request is a write request, determining whether said virtual machine ID extracted from said received request corresponds to said write virtual machine ID.

In an embodiment, a non-transitory computer-readable medium's contents configure a computing system to control communications over a communication system with a physical address range, the communication system coupling a processing core, a first circuit and a second circuit together. The controlling communications includes: starting a hypervisor on a microprocessor of the processing core; storing, under control of the hypervisor, a first virtual machine ID value to a first register associated with a first master interface circuit associated with the microprocessor; storing, under control of the hypervisor, a second virtual machine ID value to a second register associated with a second master interface circuit associated with the second circuit; storing, under control of the hypervisor executing on the first processing core, a third virtual machine ID value to a third register; inserting, by the first master interface circuit, the stored first virtual machine ID into read or write requests forwarded from the first processing core to the communication system; inserting, by the second master interface circuit, the stored second virtual machine ID into read or write requests forwarded from the second circuit to the communication system; and selectively forwarding, under control of a slave interface circuit associated with the first circuit, a read or write request addressed to an address sub-range of the physical address range from the communication system to the first circuit. The selectively forwarding includes: extracting a virtual machine ID from the request addressed to the address sub-range; reading the third virtual machine ID from the third register; determining whether the virtual machine ID extracted from the request corresponds to said third virtual machine ID; in response to determining that said virtual machine ID extracted from the request corresponds to said third virtual machine ID, forwarding the request to said first circuit; and in response to determining that said virtual machine ID extracted from said request does not correspond to said third virtual machine ID, inhibiting forwarding of said request to said first circuit. In an embodiment, the method comprising: starting a first virtual machine on a second processing core coupled to the communication system; and storing, under control of the hypervisor, a fourth virtual machine ID value to a fourth register associated with a first master interface circuit of the second processing core. In an embodiment, the first virtual machine ID and the third virtual machine ID are a same virtual machine ID associated with the hypervisor. In an embodiment, the method comprises: storing a read virtual machine ID and a write virtual machine ID into the third register, wherein the determining whether said virtual machine ID extracted from the request corresponds to the third virtual machine ID comprises: determining whether the received request is a read request or a write request; in response to determining that the received request is a read request, determining whether said virtual machine ID extracted from said received request corresponds to said read virtual machine ID; and in response to determining that the received request is a write request, determining whether said virtual machine ID extracted from said received request corresponds to said write virtual machine ID. In an embodiment, the computing system comprises the microprocessor and the contents comprise instructions executed by the hypervisor.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processing system, comprising:
a communication system having a physical address range;
a plurality of processing cores coupled to the communication system, each processing core comprising:
  a microprocessor, which, in operation, executes software instructions; and
  a first master interface circuit associated with the processing core, wherein the first master interface circuit, in operation, forwards read or write requests from said microprocessor to said communication system, said read or write requests including a physical address of said physical address range, wherein the plurality of processing cores, in operation, execute a hypervisor and one or more virtual machines, each virtual machine being associated with a respective virtual machine ID;
a first circuit;
a first slave interface circuit associated with the first circuit, wherein the first slave interface circuit, in operation, selectively forwards read or write requests addressed to an address sub-range of the physical address range from said communication system to said first circuit;
a second circuit;
a second master interface circuit associated with the second circuit, wherein the second master interface circuit, in operation, forwards read or write requests from said second circuit to said communication system;
a plurality of first registers associated with respective first master interface circuits of the plurality of processing cores, wherein the plurality of first registers, in operation, store virtual machine IDs associated with respective first master interface circuits of the plurality of processing cores;
a second register, associated with the second master interface circuit, wherein the second register, in operation, stores a second virtual machine ID; and
a third register, associated with the first slave interface circuit, wherein the third register, in operation, stores a third virtual machine ID,
wherein the plurality of first registers, the second register and the third register are programmable via the hypervisor;
wherein the plurality of first registers, the second register, and the third register are not programmable via the one or more virtual machines;
wherein the first master interface circuit of a processing core of the plurality of processing cores, in operation, reads a first virtual machine ID from an associated first register and inserts the first virtual machine ID into the read or write requests forwarded from the microprocessor of the processing core to the communication system;
wherein said second master interface circuit, in operation, reads said second virtual machine ID from said second register and inserts said second virtual machine ID into said read or write requests forwarded from said second circuit to said communication system;
wherein said first slave interface circuit, in operation, responds to a read or write request received from the communication system and addressed to an address of the address sub-range of the physical address range by:

extracting a virtual machine ID from said received request;

reading said third virtual machine ID from said third register;

determining whether said virtual machine ID extracted from said received request corresponds to said third virtual machine ID;

in response to determining that said virtual machine ID extracted from said received request corresponds to said third virtual machine ID, forwarding said read or write request to said first circuit; and in response to determining that said virtual machine ID extracted from said received request does not correspond to said third virtual machine ID, inhibiting forwarding of said read or write request to said first circuit, wherein said third register, in operation, stores a read virtual machine ID and a write virtual machine ID; and said determining whether said virtual machine ID extracted from said received request corresponds to said third virtual machine ID comprises:

determining whether the received request is a read request or a write request;

in response to determining that the received request is a read request, determining whether said virtual machine ID extracted from said received request corresponds to said read virtual machine ID; and in response to determining that the received request is a write request, determining whether said virtual machine ID extracted from said received request corresponds to said write virtual machine ID.

2. The processing system according to claim 1, wherein, when a processing core is executing said hypervisor, the respective first master interface circuit associated with the processing core, in operation, inserts into said read or write requests forwarded from the respective microprocessor of the processing core executing the hypervisor to said communication system a virtual machine ID associated with said hypervisor.

3. The processing system according to claim 1, wherein, when a processing core is executing said hypervisor, the respective first master interface circuit associated with the processing core, in operation, inserts into said read or write requests forwarded from the respective microprocessor of the processing core executing the hypervisor to said communication system one or more bits indicating privilege information.

4. The processing system according to claim 1, wherein, when a processing core is executing said hypervisor, the respective first master interface circuit associated with the processing core, in operation, inserts into said read or write requests forwarded from the respective microprocessor of the processing core executing the hypervisor to said communication system a virtual machine ID associated with said hypervisor and one or more bits indicating privilege information.

5. The processing system according to claim 1, wherein, said microprocessor has associated a second slave interface circuit, which in operation, forwards read or write requests addressed to a first address sub-range from said communication system to said first register;

said second circuit has associated a third slave interface circuit configured to forward read or write requests addressed to a second address sub-range from said communication system to said second register; or said microprocessor has associated a second slave interface circuit, which in operation, forwards read or write requests addressed to a first address sub-range from said communication system to said first register and said second circuit has associated a third slave interface circuit configured to forward read or write requests addressed to a second address sub-range from said communication system to said second register.

6. The processing system according to claim 5, wherein:

said processing system comprises a fourth slave interface circuit, which, in operation, forwards read or write requests addressed to a third address sub-range from said communication system to said third register; or said first slave interface circuit is configured to forward read or write requests addressed to the third address sub-range from said communication system to said third register.

7. The processing system according to claim 6, wherein at least one of said first slave interface circuit, said second slave interface circuit, said third slave interface circuit and said fourth slave interface circuit, in operation:

receives a read or write request addressed to a respective address sub-range;

extracts from said received request a virtual machine ID, privilege information, or both a virtual machine ID and privilege information; and in response to determining that said virtual machine ID extracted from said received request corresponds to a determined virtual machine ID or said privilege information has a determined value, forwards said read or write request to the respective register.

8. The processing system according to claim 1, wherein said first register, in operation, stores a first Address Space ID and said first master interface circuit, in operation, inserts said first Address Space ID into said read or write requests forwarded from said microprocessor to said communication system;

wherein said second register, in operation, stores a second Address Space ID and said second master interface circuit, in operation, inserts said second Address Space ID into said read or write requests forwarded from said second circuit to said communication system; and wherein said third register, in operation, stores a third Address Space ID and said slave interface circuit, in operation:

extracts from said received request an Address Space ID, reads said third Address Space ID from said third register, determines whether said Address Space ID extracted from said received request corresponds to said third Address Space ID, and forwards said read or write request to said first circuit in response to determining said Address Space ID extracted from said received request corresponds to said third Address Space ID.

9. The processing system according to claim 1, comprising a third circuit, wherein said second register, in operation, stores a fourth virtual machine ID, wherein said second master interface circuit, in operation, forwards read or write requests from said third circuit to said communication system, and wherein said second master interface circuit, in operation, reads said fourth virtual machine ID from said second register and inserts said fourth virtual machine ID into said read or write requests forwarded from said third circuit to said communication system.

10. The processing system according to claim 9, wherein said second circuit, said third circuit and said second master interface circuit implement a DMA controller, wherein said second circuit corresponds to a read channel sending read requests and said third circuit corresponds to a write channel sending write requests.

11. The processing system of claim 1, comprising an integrated circuit including:
the communication system;
the plurality of processing cores;
the first circuit;
the first slave interface circuit;
the second circuit;
the second master interface circuit;
the plurality of first registers;
the second register; and
the third register.

12. The processing system according to claim 1, wherein said hypervisor, in operation,
starts a first virtual machine on a first processing core of the plurality of processing cores; and
starts a second virtual machine on a second processing core of the plurality of processing cores,
wherein said first slave interface circuit, in operation:
responds to read or write requests received via the communication system from the first virtual machine or the second circuit and addressed to an address of the address sub-range by selectively forwarding the read or write requests to said first circuit; and
inhibits the forwarding of read or write requests received from the second virtual machine to the first circuit via the communication system.

13. A device, comprising:
a plurality of processing systems; and
a communication bus, which, in operation, couples the plurality of processing systems together, wherein each processing system of the plurality of processing systems includes:
a communication system having a physical address range;
a plurality of processing cores coupled to the communication system, each processing core comprising:
a microprocessor, which, in operation, executes software instructions; and
a first master interface circuit associated with the processing core, wherein the first master interface circuit, in operation, forwards read or write requests from said microprocessor to said communication system, said read or write requests including a physical address of said physical address range, wherein the plurality of processing cores, in operation, execute a hypervisor and one or more virtual machines, each virtual machine being associated with a respective virtual machine ID;
a first circuit;
a first slave interface circuit associated with the first circuit, wherein the first slave interface circuit, in operation, selectively forwards read or write requests addressed to an address sub-range of the physical address range from said communication system to said first circuit;
a second circuit;
a second master interface circuit associated with the second circuit, wherein the second master interface circuit, in operation, forwards read or write requests from said second circuit to said communication system;
a plurality of first registers associated with respective first master interface circuits of the plurality of processing cores, wherein the plurality of first registers, in operation, store virtual machine IDs associated with respective first master interface circuits of the plurality of processing cores;
a second register, associated with the second master interface circuit, wherein the second register, in operation, stores a second virtual machine ID; and
a third register, associated with the first slave interface circuit, wherein the third register, in operation, stores a third virtual machine ID, wherein,
the plurality of first registers, the second register and the third register are programmable via the hypervisor;
the plurality of first registers, the second register, and the third register are not programmable via the one or more virtual machines;
the first master interface circuit of a processing core of the plurality of processing cores, in operation, reads the first virtual machine ID from the associated first register and inserts the first virtual machine ID into read or write requests forwarded from the microprocessor of the processing core to the communication system of the processing system;
said second master interface circuit, in operation, reads said second virtual machine ID from said second register and inserts said second virtual machine ID into said read or write requests forwarded from said second circuit to said communication system;
said first slave interface circuit, in operation, responds to a read or write request received from the communication system and addressed to an address of the address sub-range of the physical address range by:
extracting a virtual machine ID from said received request;
reading said third virtual machine ID from said third register;
determining whether said virtual machine ID extracted from said received request corresponds to said third virtual machine ID;
in response to determining that said virtual machine ID extracted from said received request corresponds to said third virtual machine ID, forwarding said read or write request to said first circuit; and
in response to determining that said virtual machine ID extracted from said received request does not correspond to said third virtual machine ID, inhibiting forwarding of said read or write request to said first circuit; wherein,
said third register, in operation, stores a read virtual machine ID and a write virtual machine ID; and
said determining whether said virtual machine ID extracted from said received request corresponds to said third virtual machine ID comprises:
determining whether the received request is a read request or a write request;
in response to determining that the received request is a read request, determining whether said virtual machine ID extracted from said received request corresponds to said read virtual machine ID; and
in response to determining that the received request is a write request, determining whether said virtual machine ID extracted from said received request corresponds to said write virtual machine ID.

14. The device of claim 13, comprising a plurality of integrated circuits each including one or more processing systems of the plurality of processing systems, wherein the communication bus, in operation, couples the plurality of integrated circuits together.

15. The device of claim 13, wherein the device is a vehicle having an engine and the plurality of processing systems, in operation, generate control signals to control the engine.

16. The device according to claim 13, wherein said hypervisor, in operation,
starts a first virtual machine on a first processing core of the plurality of processing cores; and
starts a second virtual machine on a second processing core of the plurality of processing cores,
wherein said first slave interface circuit, in operation:
responds to read or write requests received via the communication system from the first virtual machine or the second circuit and addressed to an address of the address sub-range by selectively forwarding the read or write requests to said first circuit; and
inhibits the forwarding of read or write requests received from the second virtual machine to the first circuit via the communication system.

17. A method, comprising:
controlling communication over a communication system having a physical address range and coupling a plurality of processing cores, a first circuit and a second circuit together, the controlling including:
starting a hypervisor on a microprocessor of a first processing core of the plurality of processing cores;
executing one or more virtual machines on the plurality of processing cores, each virtual machine being associated with a respective virtual machine ID;
storing, under control of the hypervisor, first virtual machine IDs associated with respective first master interface circuits of the plurality of processing cores to respective first registers of a plurality of first registers;
storing, under control of the hypervisor, a second virtual machine ID to a second register associated with a second master interface circuit associated with the second circuit;
storing, under control of the hypervisor, a third virtual machine ID to a third register;
inserting, by a first master interface circuit of the first processing core, the stored first virtual machine ID associated with the first master interface circuit into read or write requests forwarded from the first processing core to the communication system;
inserting, by the second master interface circuit, the stored second virtual machine ID into read or write requests forwarded from the second circuit to the communication system; and
selectively forwarding, under control of a slave interface circuit associated with the first circuit, a read or write request addressed to an address sub-range of the physical address range from the communication system to the first circuit, the selectively forwarding including:
extracting a virtual machine ID from the request addressed to the address sub-range;
reading the third virtual machine ID from the third register;
determining whether the virtual machine ID extracted from the request corresponds to said third virtual machine ID;
in response to determining that said virtual machine ID extracted from the request corresponds to said third virtual machine ID, forwarding the request to said first circuit; and
in response to determining that said virtual machine ID extracted from said request does not correspond to said third virtual machine ID, inhibiting forwarding of said request to said first circuit,
wherein, the method comprises:
storing a read virtual machine ID and a write virtual machine ID into the third register, wherein the determining whether said virtual machine ID extracted from the request corresponds to the third virtual machine ID comprises:
determining whether the received request is a read request or a write request;
in response to determining that the received request is a read request, determining whether said virtual machine ID extracted from said received request corresponds to said read virtual machine ID; and
in response to determining that the received request is a write request, determining whether said virtual machine ID extracted from said received request corresponds to said write virtual machine ID, and
wherein:
the plurality of first registers, the second register and the third register are programmable via the hypervisor; and
the plurality of first registers, the second register, and the third register are not programmable via the one or more virtual machines.

18. The method according to claim 17, comprising:
starting a first virtual machine on a second processing core coupled to the communication system; and
storing, under control of the hypervisor, a fourth virtual machine ID value-to a fourth register associated with a first master interface circuit of the second processing core.

19. The method according to claim 17, wherein the first virtual machine ID and the third virtual machine ID are a same virtual machine ID associated with the hypervisor.

20. A non-transitory computer-readable medium having contents which configure a computing system to control communications over a communication system with a physical address range, the communication system coupling a plurality of processing cores, a first circuit and a second circuit together, the controlling communications including:
starting a hypervisor on a microprocessor of a first processing core of the plurality of processing cores;
executing one or more virtual machines on the plurality of processing cores, each virtual machine being associated with a respective virtual machine ID;
storing, under control of the hypervisor, first virtual machine IDs associated with respective first master interface circuits of the plurality of processing cores to respective first registers of a plurality of first registers;
storing, under control of the hypervisor, a second virtual machine ID to a second register associated with a second master interface circuit associated with the second circuit;
storing, under control of the hypervisor, a third virtual machine ID to a third register;
inserting, by first master interface circuit of the first processing core, the stored first virtual machine ID associated with the first master interface circuit into read or write requests forwarded from the first processing core to the communication system;
inserting, by the second master interface circuit, the stored second virtual machine ID into read or write requests forwarded from the second circuit to the communication system; and
selectively forwarding, under control of a slave interface circuit associated with the first circuit, a read or write request addressed to an address sub-range of the physical address range from the communication system to the first circuit, the selectively forwarding including:

extracting a virtual machine ID from the request addressed to the address sub-range;

reading the third virtual machine ID from the third register;

determining whether the virtual machine ID extracted from the request corresponds to said third virtual machine ID;

in response to determining that said virtual machine ID extracted from the request corresponds to said third virtual machine ID, forwarding the request to said first circuit; and in response to determining that said virtual machine ID extracted from said request does not correspond to said third virtual machine ID, inhibiting forwarding of said request to said first circuit, wherein, the controlling includes:

storing a read virtual machine ID and a write virtual machine ID into the third register, wherein the determining whether said virtual machine ID extracted from the request corresponds to the third virtual machine ID comprises:

determining whether the received request is a read request or a write request;

in response to determining that the received request is a read request, determining whether said virtual machine ID extracted from said received request corresponds to said read virtual machine ID; and in response to determining that the received request is a write request, determining whether said virtual machine ID extracted from said received request corresponds to said write virtual machine ID, and wherein:

the plurality of first registers, the second register and the third register are programmable via the hypervisor; and the plurality of first registers, the second register, and the third register are not programmable via the one or more virtual machines.

21. The non-transitory computer-readable medium according to claim 20, the controlling communications including:

starting a first virtual machine on a second processing core coupled to the communication system; and storing, under control of the hypervisor, a fourth virtual machine ID to a fourth register associated with a first master interface circuit of the second processing core.

22. The non-transitory computer-readable medium according to claim 20, wherein the first virtual machine ID and the third virtual machine ID are a same virtual machine ID associated with the hypervisor.

23. The non-transitory computer-readable medium according to claim 20, wherein the computing system comprises the microprocessor and the contents comprise instructions executed by the hypervisor.

* * * * *